(12) United States Patent
Cho et al.

(10) Patent No.: US 10,452,106 B2
(45) Date of Patent: Oct. 22, 2019

(54) FOLDABLE DEVICE AND CONTROLLING METHOD THEREOF

(71) Applicant: LG ELECTRONICS INC., Seoul (KR)

(72) Inventors: Taehoon Cho, Seoul (KR); Wonseok Joung, Seoul (KR); Eunhye Kim, Seoul (KR); Minkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/474,574

(22) Filed: Mar. 30, 2017

(65) Prior Publication Data

US 2017/0357292 A1 Dec. 14, 2017

(30) Foreign Application Priority Data

Jun. 14, 2016 (KR) ........................ 10-2016-0073808

(51) Int. Cl.
*G05B 19/31* (2006.01)
*G06F 1/16* (2006.01)
*H04M 1/02* (2006.01)
*G06F 3/0354* (2013.01)

(52) U.S. Cl.
CPC ........... *G06F 1/1656* (2013.01); *G05B 19/31* (2013.01); *G06F 1/1616* (2013.01); *G06F 1/1641* (2013.01); *G06F 1/1643* (2013.01); *G06F 1/1647* (2013.01); *G06F 1/1677* (2013.01); *G06F 1/1679* (2013.01); *G06F 3/03545* (2013.01); *H04M 1/0216* (2013.01); *G05B 2219/37582* (2013.01)

(58) Field of Classification Search
CPC .......... G05B 19/31; G05B 2219/37582; G06F 1/1616; G06F 1/1641; G06F 1/1643; G06F 1/1647; G06F 1/1656; G06F 1/1677; G06F 1/1679; G06F 3/03545; H04M 1/0216
See application file for complete search history.

(56) References Cited

U.S. PATENT DOCUMENTS

| | | | |
|---|---|---|---|
| 2005/0113071 A1 | 5/2005 | Nagata | |
| 2006/0080805 A1* | 4/2006 | Takagi | E05F 3/14 16/326 |
| 2010/0071167 A1 | 3/2010 | Huang | |
| 2011/0050388 A1* | 3/2011 | Lawrence | G06F 21/31 340/5.8 |
| 2014/0111954 A1* | 4/2014 | Lee | G06F 1/1641 361/749 |
| 2014/0223551 A1 | 8/2014 | Lin et al. | |

(Continued)

*Primary Examiner* — Abdelmoniem I Elamin
(74) *Attorney, Agent, or Firm* — Birch, Stewart, Kolasch & Birch, LLP

(57) ABSTRACT

A foldable device including a first body supporting a first display region; a second body supporting a second display region; a sensor configured to sense a folding angle between the first body and the second body; an actuator configured to change the folding angle; and a controller configured to control the actuator to increase the folding angle between the first body and the second body without user physical pressure in response to a first predetermined input, and control the actuator unit to decrease the folding angle between the first body and the second body without user physical pressure in response to a second predetermined input.

16 Claims, 30 Drawing Sheets

(56) References Cited

U.S. PATENT DOCUMENTS

| | | | |
|---|---|---|---|
| 2014/0226276 A1 | 8/2014 | Sung | |
| 2014/0320393 A1* | 10/2014 | Modarres | G06F 3/017 |
| | | | 345/156 |
| 2016/0187928 A1* | 6/2016 | Zeng | G06F 1/1641 |
| | | | 361/679.27 |
| 2016/0302316 A1* | 10/2016 | Jeong | G05B 11/01 |
| 2017/0060248 A1* | 3/2017 | Modarres | G06F 3/017 |
| 2017/0303414 A1* | 10/2017 | Chu | H05K 5/0017 |
| 2018/0039410 A1* | 2/2018 | Kim | G06F 3/04817 |

* cited by examiner (a)    (b)

FIG. 6
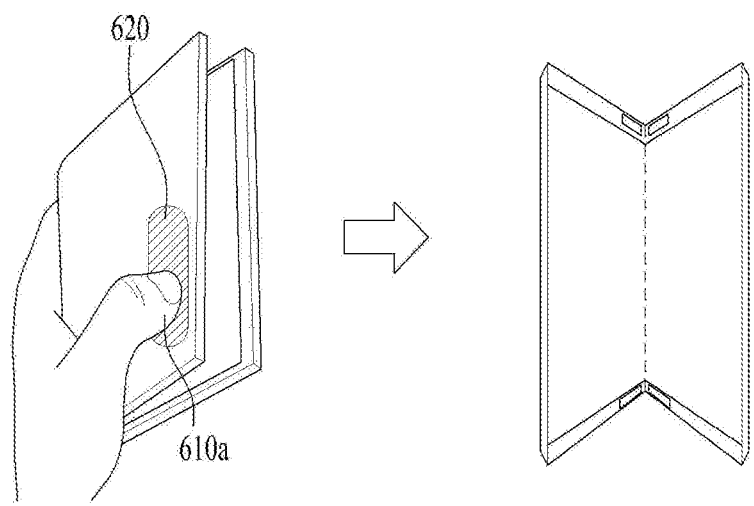
(a)
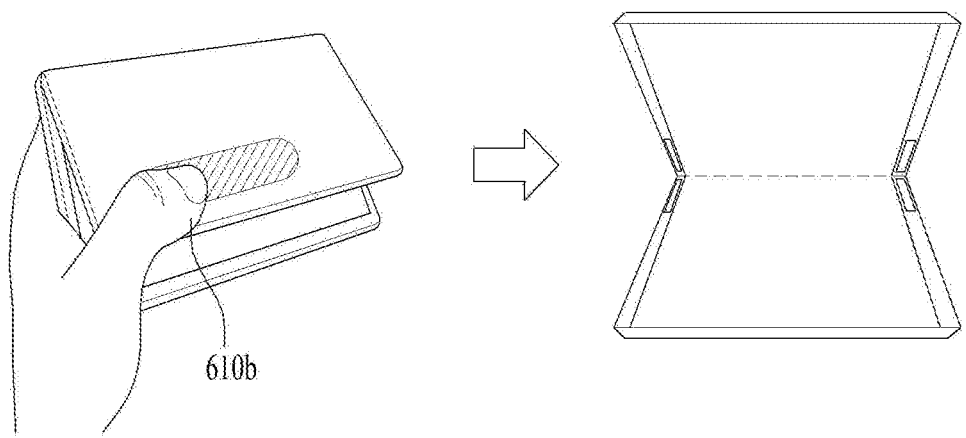
(b)

FIG. 19
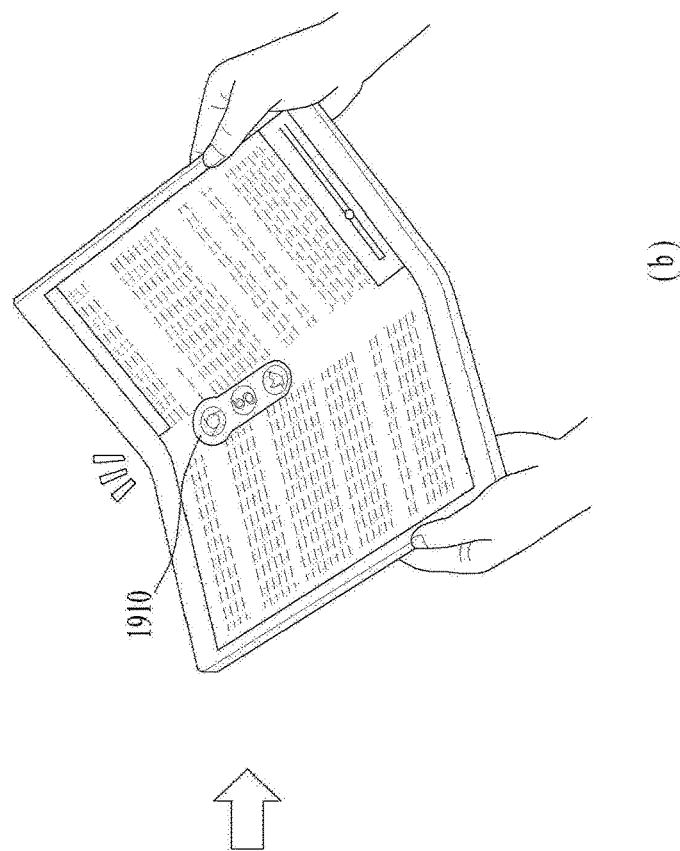
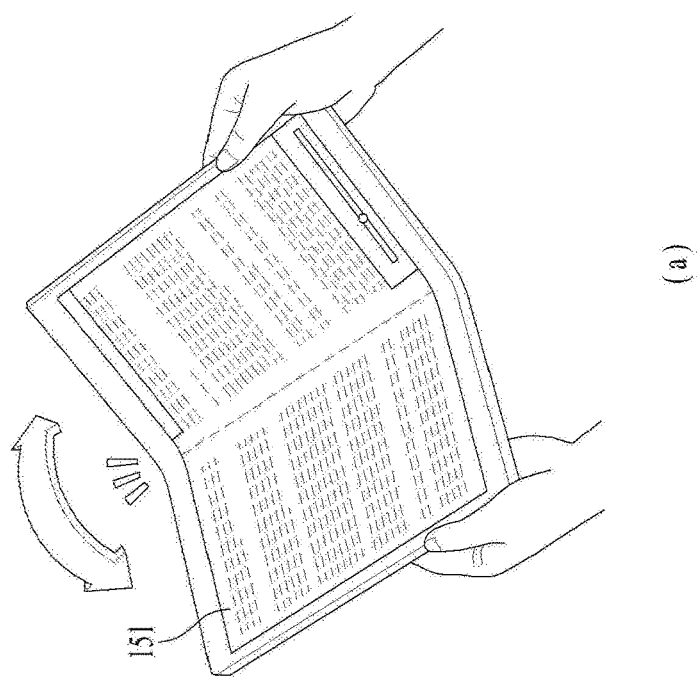

FIG. 21
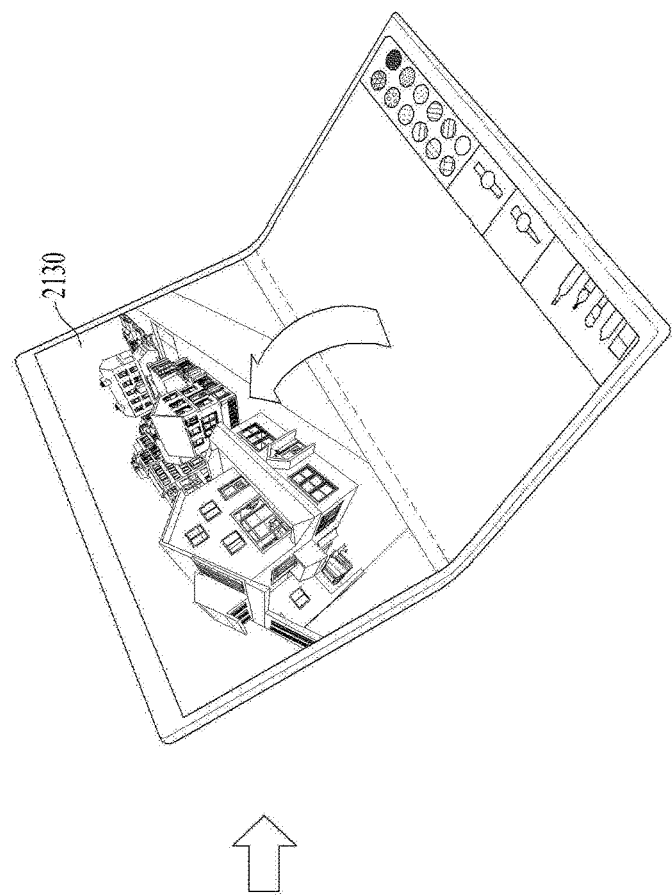
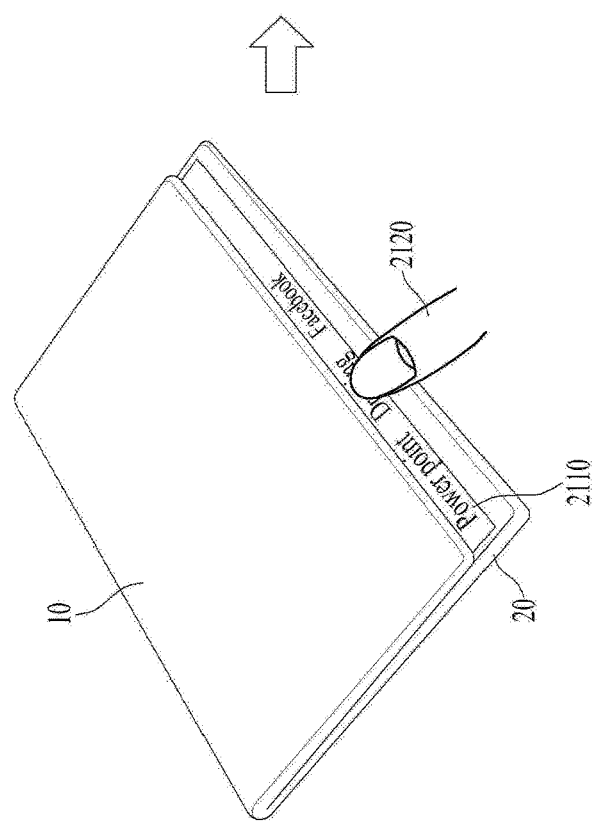

(a)            (b)

FOLDABLE DEVICE AND CONTROLLING METHOD THEREOF

Pursuant to 35 U.S.C. § 119(a), this application claims the benefit of earlier filing date and right of priority to Korean Application No. 10-2016-0073808, filed on Jun. 14, 2016, the contents of which are hereby incorporated by reference herein in their entirety.

BACKGROUND OF THE INVENTION

Field of the Invention

The present invention relates to a foldable device, and more particularly, to a foldable device and controlling method thereof. Although the present invention is suitable for a wide scope of applications, it is particularly suitable for changing a folding angle variously in accordance with a type of an input signal sensed by the foldable device.

Discussion of the Related Art

A mobile terminal can perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. In addition, the mobile terminals can be further classified into handheld terminals and vehicle mounted terminals. There are ongoing efforts to support and increase the functionality of mobile terminals. Such efforts include software and hardware improvements, as well as changes and improvements in the structural components which form the mobile terminal.

Meanwhile, a flexible display device corresponding to a sort of a mobile terminal means a device having a display deformable like a paper. Flexible devices include a foldable display, a rollable display, a bendable display and the like. For a foldable display foldable like paper, various user interfaces are needed in consideration of the foldable display is repeatedly opened and closed.

SUMMARY OF THE INVENTION

Accordingly, embodiments of the present invention are directed to a foldable device and controlling method thereof that substantially obviate one or more problems due to limitations and disadvantages of the related art.

One object of the present invention is to provide a foldable device and controlling method thereof, by which a folding angle can be variously changed in accordance with a user input or a preset situation.

Another object of the present invention is to provide a foldable device and controlling method thereof, by which a display breakage can be prevented by adjusting an opening/closed speed of the foldable device using an electromagnet or a memory alloy.

Still another object of the present invention is to provide a foldable device and controlling method thereof, by which an open state or a closed state can be conveniently and easily switched to each other to enable a user to use the device with one hand (i.e., one hand operation).

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a foldable device according to one embodiment of the present invention may include a first body supporting a first display region, a second body supporting a second display region, a display unit including the first display region and the second display region, a sensing unit sensing a folding angle between the first body and the second body, an actuator unit providing a change of the folding angle, and a controller configured to determine a change information on the folding angle between the first body and the second body and control the actuator unit to change the folding angle according to the determined change information.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 6 is a diagram illustrating another example of an auto-opening through fingerprint recognition in a foldable device according to one embodiment of the present invention;

FIG. 19 is a diagram illustrating one example of a user interface provided based on a currently output content in a foldable device according to one embodiment of the present invention;

FIG. 21 is a diagram illustrating one example of controlling a folding angle based on a content run in a foldable device according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
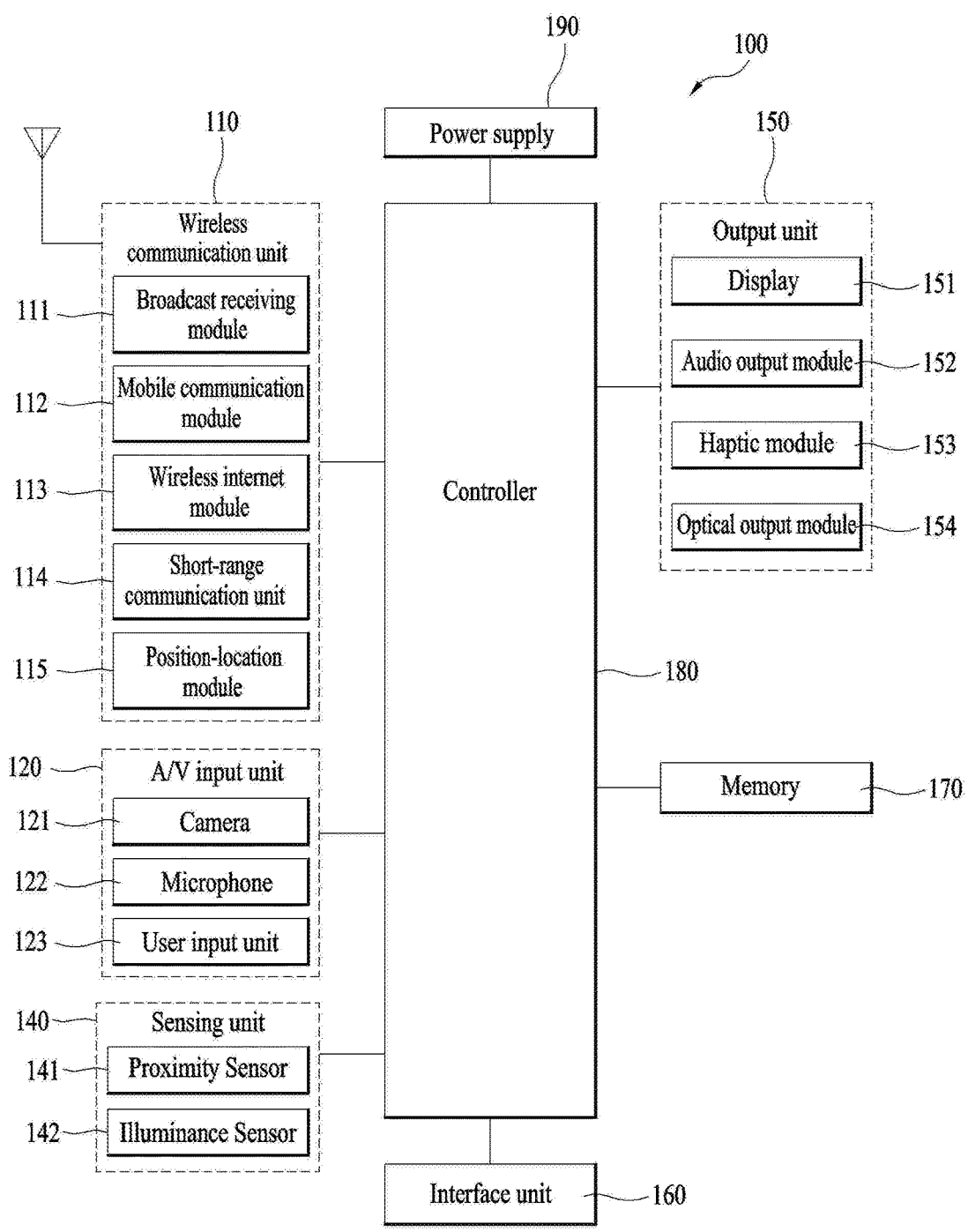
FIG. 1A is a block diagram of a mobile terminal according to an embodiment of the present disclosure.
Figure 1B:
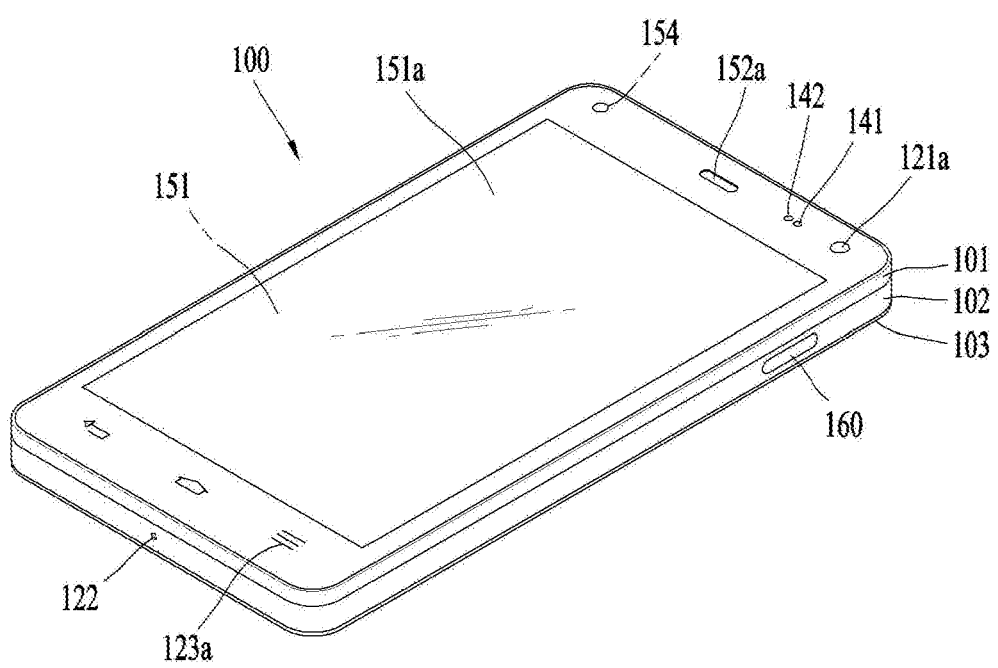
FIGS. 1B and 1C are conceptual views of one example of the mobile terminal, viewed from different directions.
Figure 1C:
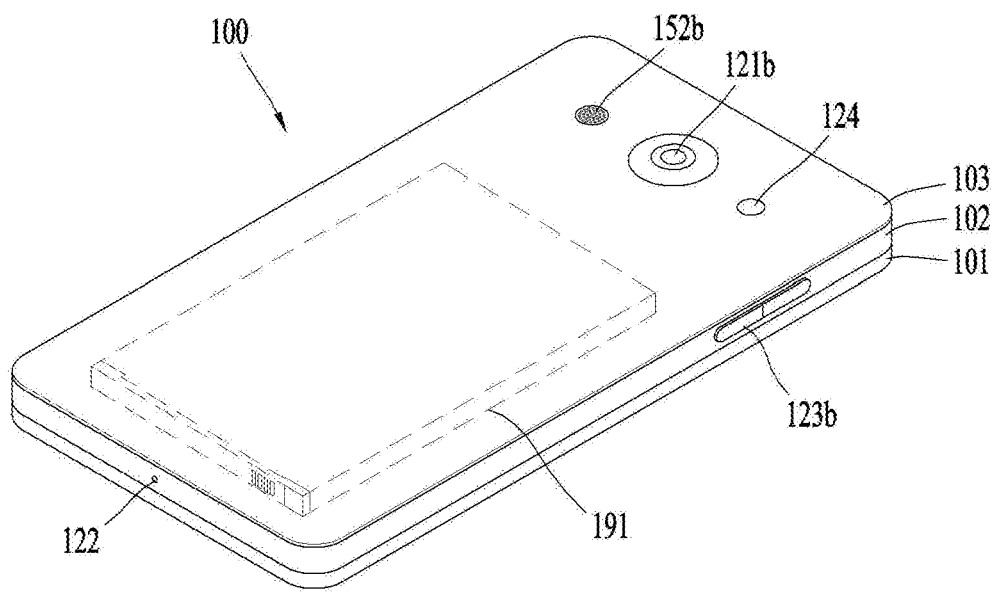

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115. The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, and information input or output through the components mentioned in the foregoing description or runs an application program saved in the memory 170, thereby providing or processing an information or function appropriate for a user.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include the left image (e.g., the left eye image) and the right image (e.g., the right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, the left image thumbnail and the right image thumbnail can be generated from the left image and the right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

The left image and the right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into the left image and the right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information. The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the Wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI. Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like. The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof. In a foldable device as a sort of a mobile terminal, a method of performing an opening/closing operation and a method of controlling a speed of the opening/closing operation are described as follows.

Figure 2:
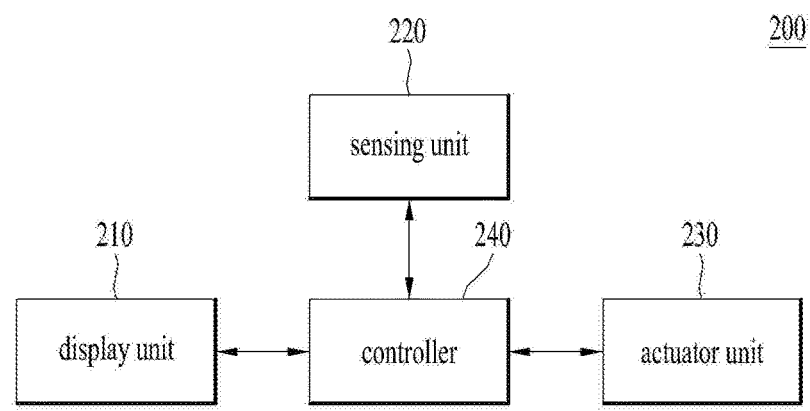
FIG. 2 is a block diagram of a foldable device according to one embodiment of the present invention.

FIG. 2 is a block diagram of a foldable device 200 according to one embodiment of the present invention. As shown, the foldable device 200 includes a display unit 210, a sensing unit 220, an actuator unit 230 and a controller 240. The foldable device 200 may further include various configuration modules.

The foldable device 200 may also include various devices such as a flexible display panel and the like. In particular, the foldable device 200 may correspond to a device foldable with reference to one axis of the flexible display panel. For example, the foldable device 200 may correspond to one of various portable devices such as a smartphone, a tablet PC, a monitor, a PDA and the like.

The display unit 210 can output visual information including a content, an application, an image, a video, an icon, a user interface and the like. Based on a control command of the controller 240, the display unit 210 can output the visual information to a screen. The display unit 210 may be embodied in the former display 151 shown in FIG. 1A.

The display unit 210 can be embodied in a flexible display panel. Particularly, one display unit corresponding to a foldable display can be partitioned into a first display region and a second display region with reference to a folding axis. This will be described in detail with reference to FIG. 3 later.

The sensing unit 220 senses various user's inputs to the foldable device 200 and an environment of the foldable device 200 and can then deliver a sensing result to enable the controller 240 to perform a corresponding operations. The sensing unit 240 may be embodied in the sensing unit 140 or the input unit 120 shown in FIG. 1A. According to one embodiment of the present invention, the sensing unit 220 may be embodied in a touchscreen together with the display unit 210. According to one embodiment of the present invention, the sensing unit 220 includes a fingerprint sensing unit, thereby sensing a user's fingerprint input.

The actuator unit 230 can provide a shape modification of the display unit 210. Based on a control command of the controller 240, the actuator unit 230 can control an angle of a folding region of the display unit 210. For instance, the actuator unit 230 of the present invention may be configured with an electromagnet, a shape memory allocation (SMA) and the like. A detailed description of the configuration of the actuator unit 230 will be made with reference to FIG. 4 later.

The controller 240 processes data, controls the respective units of the foldable device 200, and controls data transmission/reception between the units. The controller 240 of the present invention may be embodied in the former controller 180 shown in FIG. 1A. According to one embodiment of the present invention, in response to an input signal, the controller 240 can control the actuator unit 230 to modify a folding angle of the display unit.

The foldable device 200 may further include a camera, a microphone and the like. According to an embodiment of the present invention, the camera can sense an image within a view angle area and the microphone can sense user's voice. Operations performed by the foldable device 200 can be controlled by the controller 240.

Figure 3:
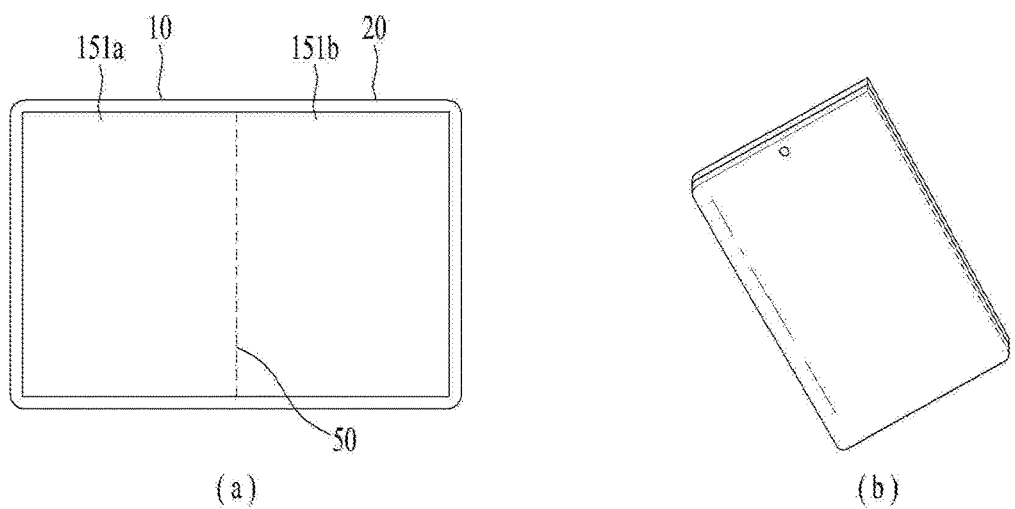
FIG. 3 is a perspective diagram of a foldable device according to one embodiment of the present invention.

Next, FIG. 3 is a perspective diagram of a foldable device according to one embodiment of the present invention. Referring to FIG. 3 (a), a display unit may include a first display region 151a and a second display region 151b. The first display region 151a can be supported by a first body 10, while the second display region 151b can be supported by a second body 20. The first display region 151a and the second display region 151*b* may be located on a first plane of the foldable device. In addition, a second plane of the foldable device may correspond to a region not including the display unit.

For instance, the foldable device may include a single display panel. In this instance, the first display region 151*a* and the second display region 151*b* are provided to a single display unit. The foldable device can have the display unit foldable with reference to a folding axis. In this instance, the display unit can be folded in a direction so that the first display region 151*a* and the second display region 151*b* confront each other or in a direction opposite to the former direction.

For instance, a folding angle of the foldable device shown in FIG. 3 (*a*) may correspond to 180°, which is assumed to be a flat mode. In this instance, a user can fully use the display unit located on the first plane of the foldable device. In addition, if the folding angle is 180°, the foldable device may correspond to the display unit being activated or unlocked state.

A folding angle of the foldable device shown in FIG. 3 (*b*) corresponds to 0°. A user can face the second place that is an opposite plane of the first plane of the foldable device. As shown, the display unit is not provided to the second plane. However, a display unit may be provided to the second plane. Also, if a folding angle is 0°, the foldable device may correspond to the display unit deactivated or locked state.

Figure 4:
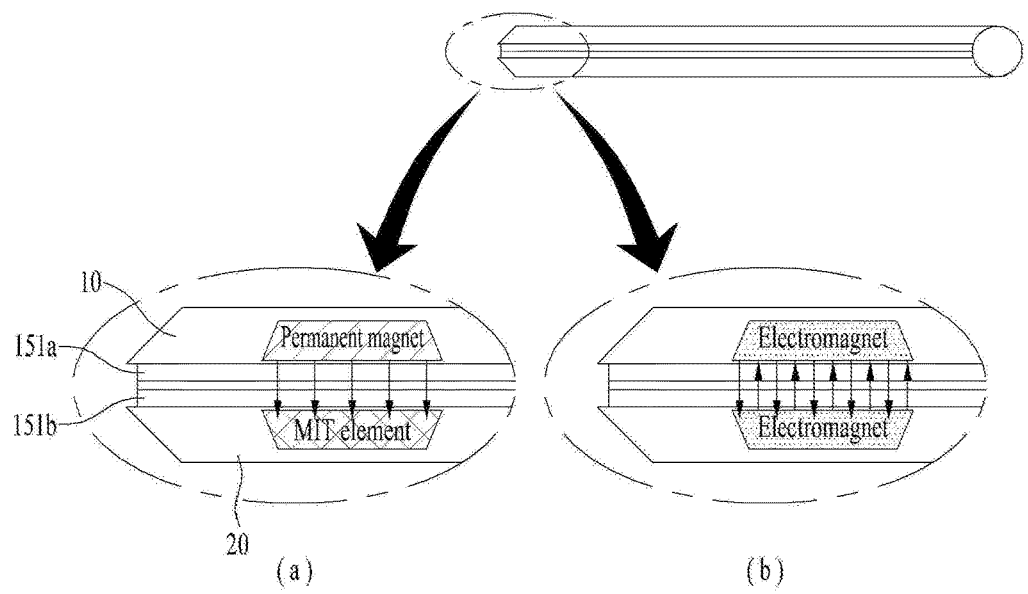
FIG. 4 is a diagram illustrating one example of an actuator unit of a foldable device according to one embodiment of the present invention.

Next, FIG. 4 is a diagram illustrating one example of an actuator unit of a foldable device according to one embodiment of the present invention. As mentioned in the foregoing description, the actuator unit of the present invention can be configured with various materials such as electromagnet, shape memory alloy and the like. The actuator unit transforms an external input into a physical movement. According to the embodiment shown in FIG. 4, a permanent magnet or electromagnet is provided to the actuator unit.

Referring to FIG. 4 (*a*), the actuator unit may include at least one of a metal-insulator transition (MIT) element and a permanent magnet. The MIT element transforms into a non-conductive material from a conductive material, through which electricity flows, in accordance with a condition. For instance, the permanent magnet may correspond to neodymium (Nd), and the MIT element and the permanent magnet can be provided to the first body 10 and the second body 20, respectively. In addition, the foldable device can control the actuator unit to maintain a state that the first and second bodies 10 and 20 touch each other using the attractive force between the conductive MIT element and the permanent magnet. In particular, through the attractive force between the conductive MIT element and the permanent magnet, the first display region 151*a* and the second display region 151*b* can come into contact with each other. Further, if user authentication for the foldable device is completed, the unlocked state can be entered by switching the MIT element to the non-conductive material.

Referring to FIG. 4 (*b*), the actuator unit can be provided with a ultra-low power magnetic element. The foldable device adjusts the strength and direction of the electromagnetic force by generating an attractive force or a repulsive force through the ultra-low power magnetic elements provided to the first and second bodies 10 and 20, whereby the opening/closing of the foldable device can be controlled. For example, the foldable device can maintain the locked state by generating the attractive force in a closed state. In addition, the foldable device generates the repulsive force in an open state, thereby switching to the closed state easily.

The actuator unit may also include a shape memory alloy. The shape memory alloy restores into an initially molded shape when a predetermined temperature is applied to the corresponding metal. For instance, the shape memory alloy may include nitinol (Ni—Ti). Moreover, the shape memory alloy may include a single shape memory alloy capable of memorizing a single shape only, a multi-directional shape memory alloy capable of restoring into various shapes according to different temperatures, or the like. In addition, the multi-directional shape memory alloy can be used to implement various folding angles. With respect to the single shape memory alloy, the corresponding embodiment shall be described with reference to FIG. 23.

According to the embodiments shown in FIGS. 5 to 30 in the following, various user interfaces related to the open/closed states of the foldable device are described. In particular, through the embodiments shown in FIGS. 5 to 9, a method of controlling an opening operation of the foldable device is described. Through the embodiments shown in FIGS. 10 to 13, a method of controlling a closing operation of the foldable device is described. A method of controlling an opening speed of the foldable device is described with reference to FIGS. 14 to 16. A method of controlling a folding angle in an open sate of the foldable device is described with reference to FIGS. 17 to 24. And, a method of controlling a folding angle of the foldable device using a stylus pen connected to the foldable device is described with reference to FIGS. 25 to 29.

According to an embodiment of the present invention, an open state of a foldable device is assumed as the first and second bodies 10 and 20 are separated from each other out of a preset angle range with reference to the folding unit. In addition, a closed state of the foldable device is assumed as the first and second bodies 10 and 20 come into contact with each other within the preset angle range with reference to the folding unit. The open/closed state of the foldable device can be driven by the aforementioned actuator unit.

Opening Control of Foldable Device

Figure 5:
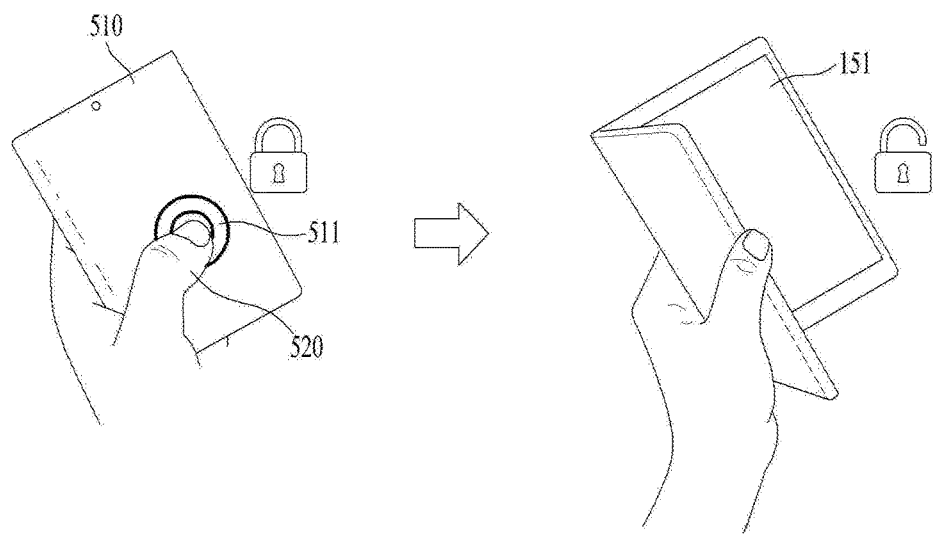
FIG. 5 is a diagram illustrating one example of an auto-opening through fingerprint recognition in a foldable device according to one embodiment of the present invention.

A foldable device needs to switch to an open state from a closed state in order to use a content through an internal display unit. Embodiments of various methods for switching to an open state from a closed state of a foldable device are shown in FIGS. 5 to 9. In particular, FIG. 5 is a diagram illustrating one example of an auto-opening through fingerprint recognition in a foldable device according to one embodiment of the present invention.

Referring to the left diagram of FIG. 5, a closed state of a foldable device corresponds to a locked state. For instance, since it is impossible to use a content in a closed state of a foldable device, such a state can correspond to a locked state of a device. In this instance, the foldable device can sense a fingerprint input 520 to a second plane 510. Particularly, the foldable device can sense the fingerprint input 520 to a fingerprint sensing region 511 in the second plane 520. An indicator indicating a fingerprint sensing capable region can also be output to the fingerprint sensing region 511.

If the fingerprint input 520 is sensed, the foldable device extracts fingerprint information from the sensed fingerprint input 520 and can then determine whether the extracted fingerprint information matches a registered fingerprint information. If the extracted fingerprint information matches the registered fingerprint information, the foldable device completes authentication and can switch to an unlocked state.

Referring to the right diagram of FIG. 5, if the authentication is completed, the foldable device controls the actuator unit to increase a folding angle between the first and second bodies. If the folding angle between the first and second bodies deviates from a preset angle range, the foldable device can control a preset content such as a home screen to be output to the display unit 151 in an unlocked state. For instance, the preset angle range may correspond to an angle exceeding 30°, by which the present invention is non-limited.

The foldable device can also perform user authentication through iris recognition, face recognition, voice recognition and/or the like as well through the fingerprint recognition. In addition, the foldable device can perform user authentication through a touch gesture, pattern recognition and/or the like. Through the present embodiment, a user can easily switch the foldable device to an open state from a closed state without applying a physical pressure.

Next, FIG. 6 is a diagram illustrating another example of an auto-opening through fingerprint recognition in a foldable device according to one embodiment of the present invention. Particularly, FIG. 6 shows a method of determining a direction for a foldable device to switch to an open state based on a direction of fingerprint recognition sensed from a second plane of the foldable device.

Referring to FIG. 6 (*a*), a foldable device can sense a fingerprint input 610*a* in a length direction of a second plane. Particularly, the foldable device can sense the fingerprint input 610*a* in the length direction to a fingerprint sensing region 620 provided to the second plane. As mentioned in the foregoing description with reference to FIG. 5, the foldable device performs a fingerprint authentication procedure and can complete user authentication in case of matching a registered fingerprint information. Moreover, in response to a fingerprint input in a length direction, the foldable device can control a device to be automatically opened in standing mode. For instance, as shown in FIG. 6 (*a*), the standing mode corresponds to a mode for providing display regions to right and left sides with reference to a folding axis, respectively.

Referring to FIG. 6 (*b*), a foldable device can sense a fingerprint input 610*b* in a width direction of a second plane. Particularly, the foldable device can sense the fingerprint input 610*b* in the width direction to a fingerprint sensing region 620 provided to the second plane. As mentioned in the foregoing description with reference to FIG. 5, the foldable device performs a fingerprint authentication procedure and can complete user authentication in case of matching a registered fingerprint information. In response to a fingerprint input in a width direction, the foldable device can control a device to be automatically opened in clamshell mode. For instance, as shown in FIG. 6 (*b*), the clamshell mode corresponds to a mode for providing display regions to upper and lower sides with reference to a folding axis, respectively.

Figure 7:
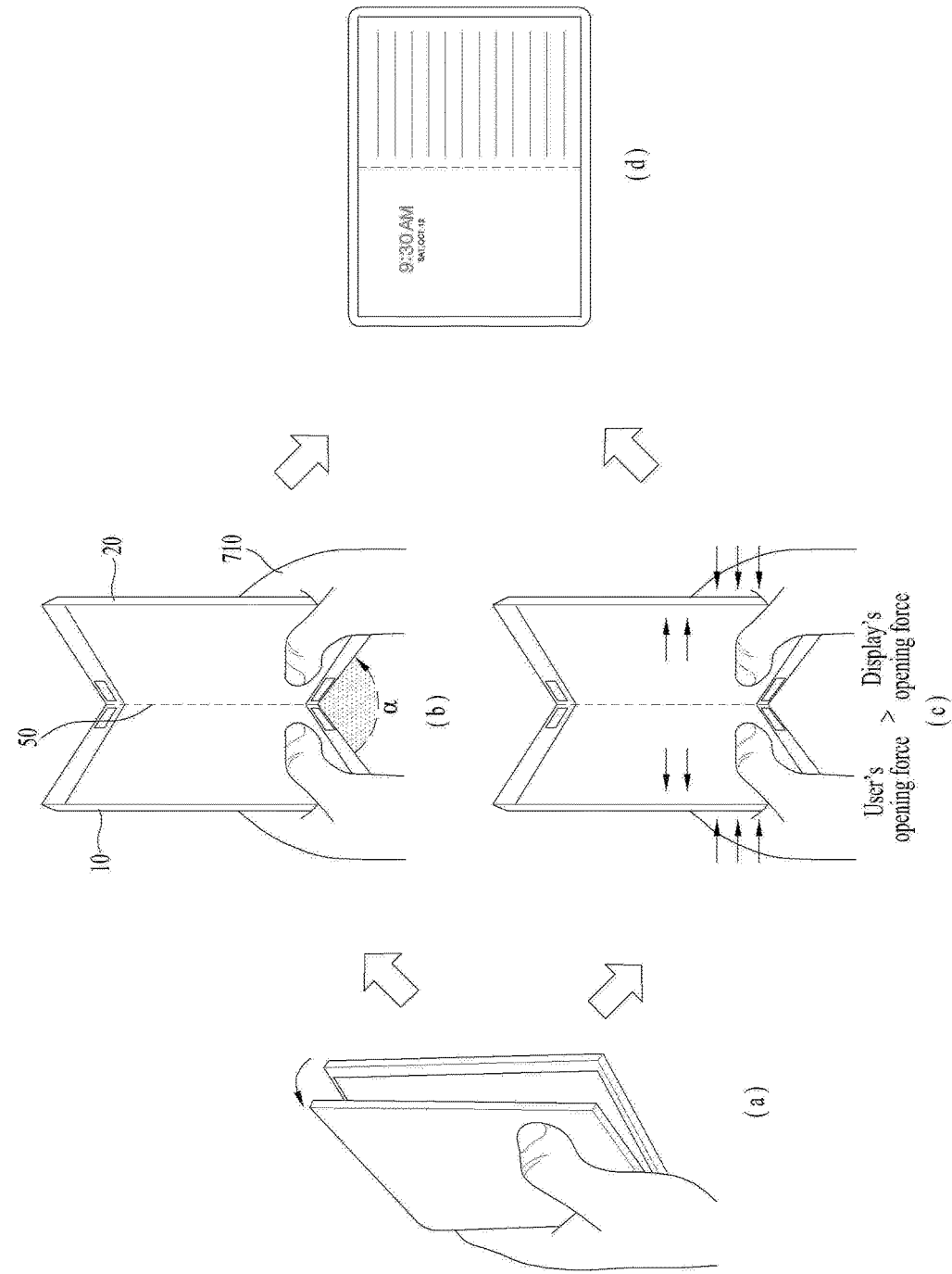
FIG. 7 is a diagram illustrating one example of an auto-opening using an angle and pressure in a foldable device according to one embodiment of the present invention.

FIG. 7 is a diagram illustrating one example of an auto-opening using an angle and pressure in a foldable device according to one embodiment of the present invention. Particularly, FIG. 7 shows a method of changing a folding angle into 180° after completion of the fingerprint authentication of the former embodiment shown in FIG. 5. According to an embodiment shown in FIG. 7 (*a*), assume that a foldable device is switched to an open sate from a closed state. For instance, the switching to the open state can be achieved by an opening by fingerprint authentication, an opening by user's pressure, an opening by pattern input, or the like.

The foldable device can control an actuator unit to adjust a folding angle into a first angle from 0°. For instance, the first angle may correspond to about 30°. This case corresponds to when a user is unable to use a display unit despite that the foldable device is in unlocked state. Hence, the user can apply an external force to the foldable device to use a content through the foldable device.

For example, as shown in FIG. 7 (*b*), in a state 710 that first and second bodies 10 and 20 are held by a user, the foldable device can control the actuator unit to provide a second angle between the first and second bodies 10 and 20 under user's control. In this instance, the second angle corresponds to an angle exceeding a threshold angle α. For instance, the threshold angle α may correspond to about 150°, by which the angle is non-limited.

If the threshold angle α is exceeded, as shown in FIG. 7 (*d*), the foldable device can control the actuator unit so that the first and second bodies 10 and 20 can automatically enter a flat state. Thus, if a user applies an external force to the foldable device to exceed the threshold angle α, a user can be regarded as intending to use the foldable device in the flat state.

In another instance, as shown in FIG. 7 (*c*), under the user's control, the foldable device can be controlled in a manner that a folding angle is increased in a state 710 that the first and second bodies 10 and 20 are held by a user. Further, the foldable device may be in a state that the folding angle is automatically increasing. The foldable device can compare an opening force of the current auto-opening with an opening force sensed from the user. In this instance, the opening force indicates a force controlled to increase a folding angle.

If the opening force sensed from the user is greater than the opening force of the device, as shown in FIG. 7 (*c*), the foldable device can control the actuator unit to provide a flat state. Yet, if the opening force sensed from the user is equal to or smaller than the opening force of the device, the foldable device can be controlled in a manner that the folding angle reaches a preset angle.

In another instance, under the user's control, the foldable device is controlled to increase the folding angle in the state 710 that the first and second bodies 10 and 20 are held by the user and can be then additionally held in a manner that the same folding angle is maintained for a time preset by the user. Further, the foldable device can be controlled to maintain the increased folding angle.

Figure 8:
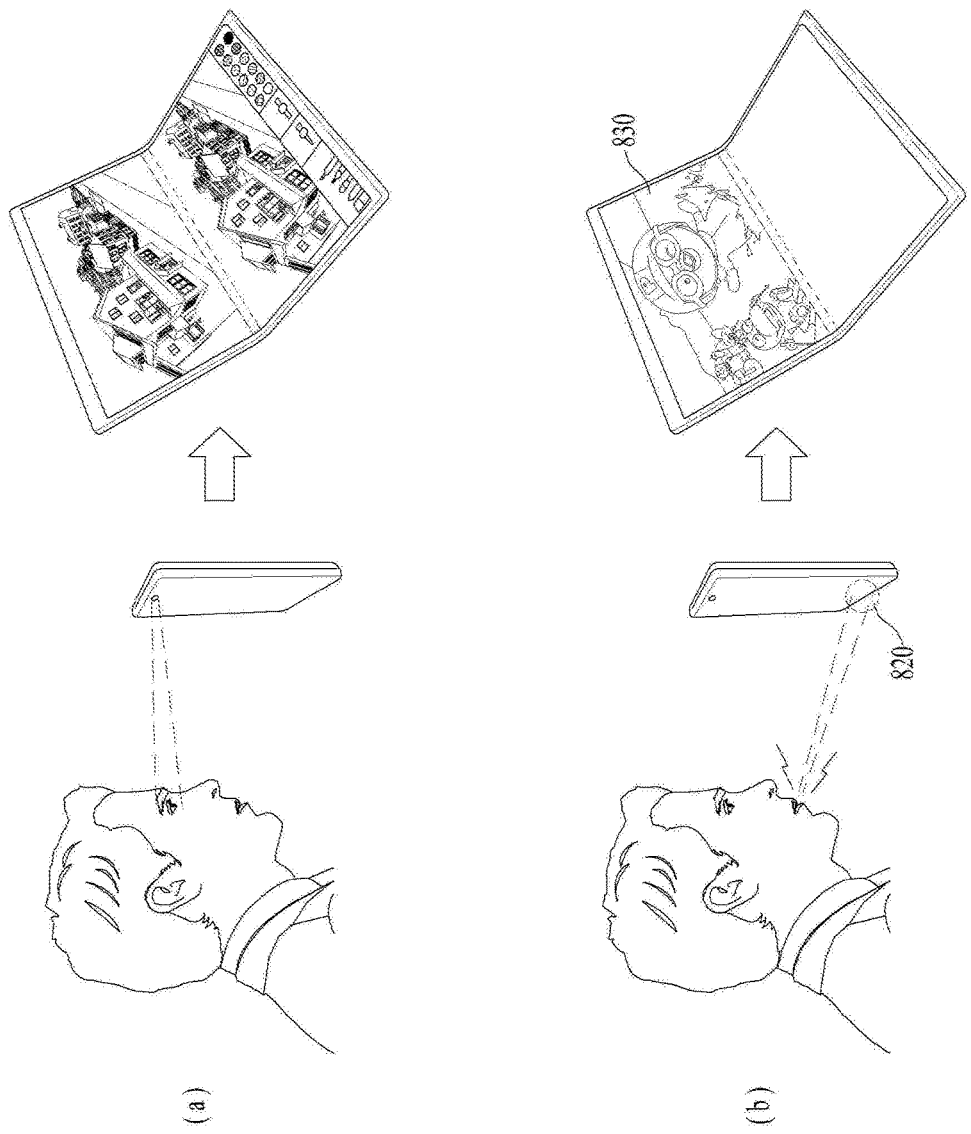
FIG. 8 is a diagram illustrating one example of an auto-opening based on various user inputs in a foldable device according to one embodiment of the present invention.

Next, FIG. 8 is a diagram illustrating one example of an auto-opening based on various user inputs in a foldable device according to one embodiment of the present invention. For instance, referring to FIG. 8 (*a*), a foldable device can sense user's iris information through a camera 810 provided to a second plane in a closed state. If the sensed iris information matches user's registered iris information, the foldable device can complete user authentication. If so, the foldable device can switch to an open state by controlling an actuator unit. Further, the foldable device can control a folding angle between first and second bodies to facilitate a display unit to be recognized at user's eye height.

In another instance, referring to FIG. 8 (*b*), a foldable device can sense user's voice through a microphone 820 in a closed state. If the sensed voice information matches user's registered voice information, the foldable device can complete user authentication. If so, the foldable device can switch to an open state by controlling an actuator unit.

The foldable device can obtain a content of voice information by converting user's voice information by STT (sound-to-text) conversion. Through this, when the foldable device switches to the open state, a necessary content 930 can be controlled to be output to a display unit based on the user's voice information. For instance, if the user's voice information is a name of a baby, the foldable device switches to the open state and can then output a cartoon content to the display unit.

Figure 9:
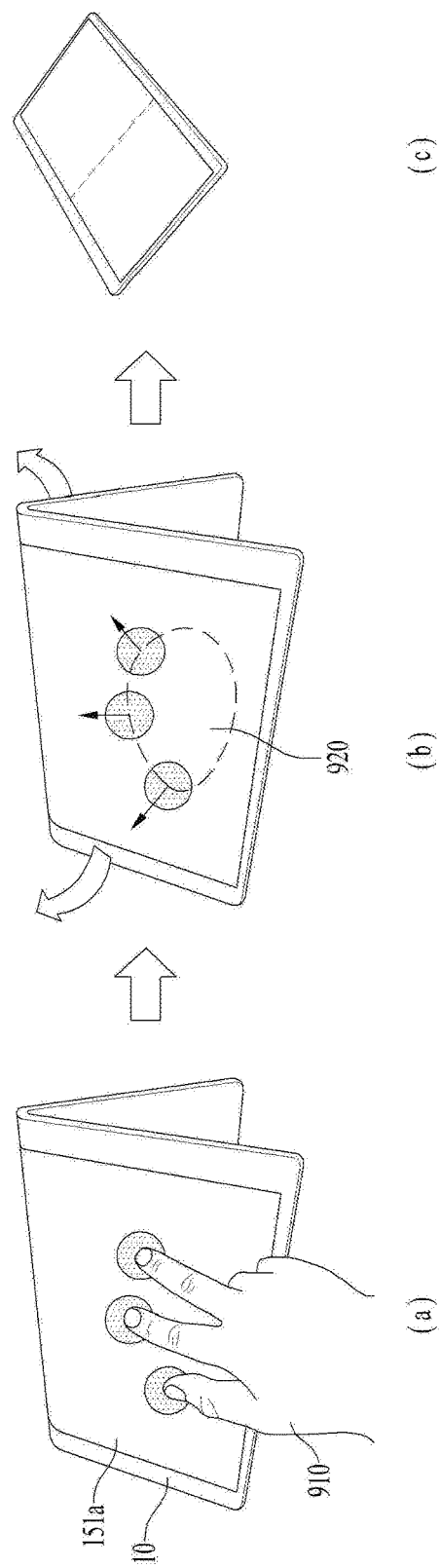
FIG. 9 is a diagram illustrating one example of an auto-opening in accordance with a gesture input in a foldable device according to one embodiment of the present invention.

FIG. 9 is a diagram illustrating one example of an auto-opening in accordance with a gesture input in a foldable device according to one embodiment of the present invention. Particularly, when a display unit is standing by being folded outward, FIG. 9 shows a case of switching to a flat mode in response to an input signal.

Referring to FIG. 9 (a), when a folding angle between first and second bodies 10 and 20 of a foldable device is a first angle, the controller can sense a first input signal 910 of a user. For instance, the first angle may be an angle between 180° and 360°. In particular, a display unit of a foldable device can be externally provided at the first angle. The first input signal 910 of the user may include a touch input with at least two fingers. For instance, according to the embodiment shown in FIG. 9, the first input signal 910 may correspond to a touch input with three fingers. In this instance, the first input signal 910 may correspond to a trigger signal for entering a control mode of the folding angle of the display unit in the foldable device.

Referring to FIG. 9 (b), the foldable device can sense a second input signal 920. The second input signal 920 may correspond to an input signal in continuation with the first input signal 910 such as a drag touch moving outward as a pinch-out touch with three fingers. If the second input signal 920 is released, as shown in FIG. 9 (c), the foldable device can control an actuator unit to enable the folding angle between the first and second bodies 10 and 20 to form a flat mode corresponding to 180°.

Closing Control of Foldable Device

In an open state of a foldable device, if a content use through a display unit is complete or a privacy protection is required, it is preferable for the foldable device to switch to a closed state. Various methods for switching to a closed state from an open state of a foldable device are described with reference to FIGS. 10 to 13 as follows.

Figure 10:
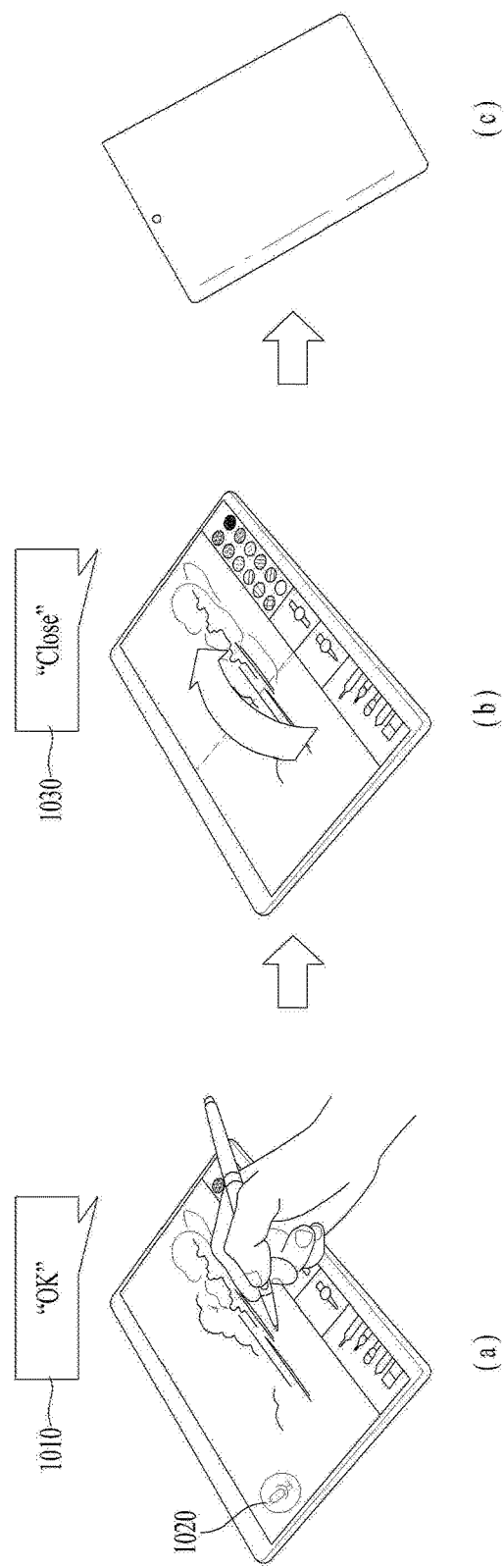
FIG. 10 is a diagram illustrating one example of an auto-closing in accordance with a voice input in a foldable device according to one embodiment of the present invention.

FIG. 10 is a diagram illustrating one example of an auto-closing in accordance with a voice input in a foldable device according to one embodiment of the present invention. Referring to FIG. 10 (a), while outputting a content in flat mode, a foldable device can sense a first input signal 1010. In this instance, the first input signal 1010 may correspond to a trigger input for activating a speech mode. The first input signal 1010 may correspond to a speech input of a determined word or sentence. As shown in FIG. 10 (a), the foldable device can indicate that a speech function is activated by outputting an indicator 1020 to the display unit.

Referring to FIG. 10 (b), while the speech function is activated, the foldable device can sense a second input signal 1030. The second input signal 1030 may correspond to various words or sentences related to 'close' or 'use end'. For example, the second input signal 1030 may include such a speech input as 'close please', 'close', 'fold', 'end of use', 'end', 'no use', 'take a rest', or the like, by which the speech input is non-limited. If so, referring to FIG. 10 (c), the foldable device can switch to a closed state by controlling an actuator unit.

Figure 11:
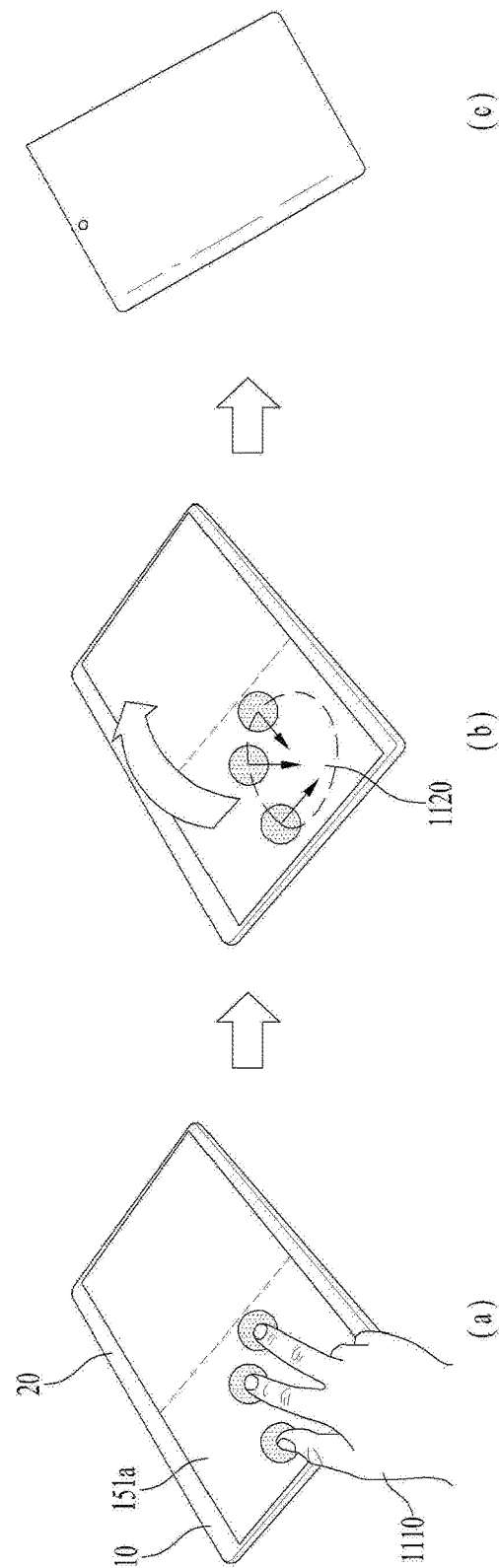
FIG. 11 is a diagram illustrating one example of an auto-closing in accordance with a gesture input in a foldable device according to one embodiment of the present invention.

Next, FIG. 11 is a diagram illustrating one example of an auto-closing in accordance with a gesture input in a foldable device according to one embodiment of the present invention. Particularly, FIG. 11 corresponds to an embodiment opposite to the auto-opening in response to the gesture input shown in FIG. 9.

Referring to FIG. 11 (a), a foldable device can sense a first input signal 1110 in flat mode. In this instance, the first input signal 1110 may include a touch input with at least two fingers. For instance, according to the embodiment shown in FIG. 11 (a), the first input signal 1110 may correspond to a touch input with 5 fingers. In this instance, the first input signal 1110 may correspond to a trigger signal for entering a control mode of controlling a folding angle between first and second devices 10 and 20 of the foldable device.

Referring to FIG. 11 (b), the foldable device can sense a second input signal 1120. The second input signal 1120 may correspond to an input signal in continuation with the first input signal 1110 such as a drag touch moving inward as a pinch-in touch with at least two fingers. If the second input signal 1120 is released, as shown in FIG. 11 (c), the foldable device can control an actuator unit to enable a closed state in which the folding angle between the first and second bodies 10 and 20 corresponds to 0°.

According to the embodiment shown in FIG. 11, each of the first and second input signals 1110 and 1120 is sensed from a first display region 151a. Hence, the foldable device can control the actuator to for a closed state by moving the first body 10. Unlike the embodiment shown in FIG. 11, if the first input signal 1110 and the second input signal 1120 are sensed from a second display region, the foldable device can control the actuator to form a closed state by moving the second body 20.

Figure 12:
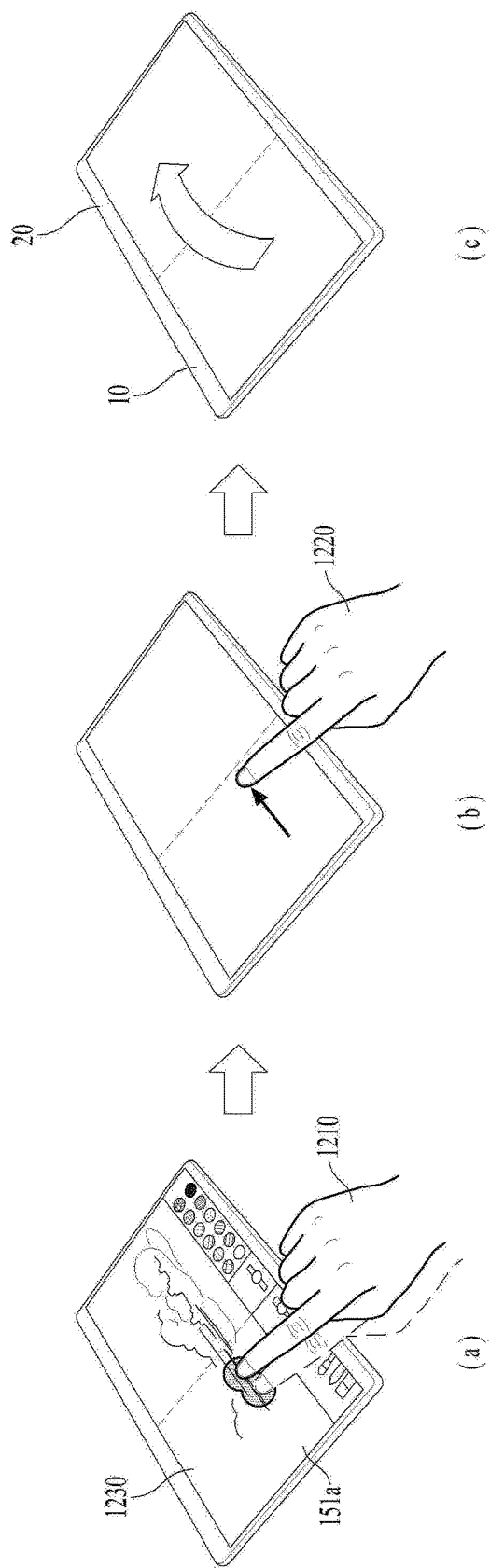
FIG. 12 is a diagram illustrating another example of an auto-closing in accordance with a gesture input in a foldable device according to one embodiment of the present invention.

FIG. 12 is a diagram illustrating another example of an auto-closing in accordance with a gesture input in a foldable device according to one embodiment of the present invention. Referring to FIG. 12 (a), a foldable device can sense a first input signal 1210 to a display unit while providing a content in flat mode. The first input signal 1210 may correspond to a double tap input, by which the input signal is non-limited. In this instance, referring to FIG. 12 (b), if the first input signal 1210 is released, the foldable device can control the display unit to be deactivated.

The foldable device can sense a second input signal 1220 to the display unit. Particularly, the foldable device can sense the second input signal 1220 to a first display region 151a. The second input signal 1220 may correspond to a drag touch input in a folding axis direction, by which the input signal is non-limited. As shown in FIG. 12 (c), the foldable device can control an actuator unit to form a closed state by moving the first body 10.

According to the embodiment shown in FIG. 12, the first and second input signals 1210 and 1220 are sensed from the first display region 151a. Unlike this, the first and second input signals 1210 and 1220 may be sensed from a second display region. In this instance, the foldable device can control the actuator unit to form a closed state by moving the second body 20.

Figure 13:
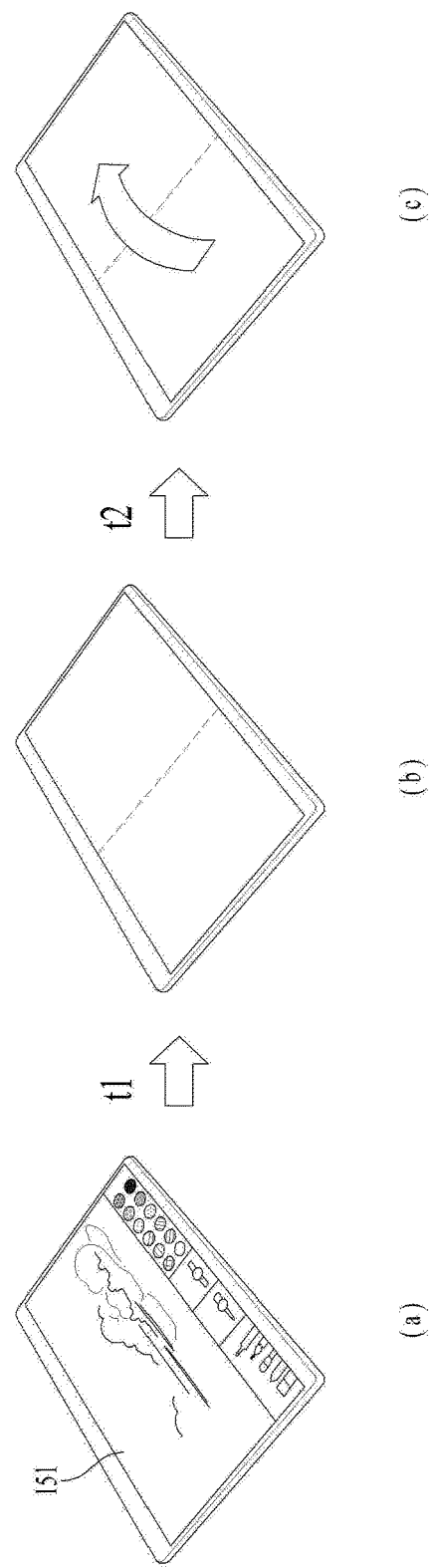
FIG. 13 is a diagram illustrating one example of an auto-closing in accordance with time expiration in a foldable device according to one embodiment of the present invention.

Next, FIG. 13 is a diagram illustrating one example of an auto-closing in accordance with time expiration in a foldable device according to one embodiment of the present invention. Referring to FIG. 13 (a), while a content is output in flat mode, if an input signal is not sensed from a user for a first preset time t1, a foldable device can determine that a use is complete. For instance, the first preset time t1 may correspond to 30 seconds, by which the time is non-limited. As shown in FIG. 13 (b), the foldable device can control the display unit to be deactivated. Although FIG. 13 (b) shows that the display unit is deactivated, it is also possible to lowering the brightness of the display unit in a content output state to reduce power consumption and protect privacy.

While a screen is deactivated, the foldable device can sense that a second preset time t2 expires. For instance, the second preset time t2 may correspond to 5 minutes, by which the time is non-limited. As shown in FIG. 13 (c), the foldable device can control an actuator unit to switch to a closed state. The reason for this is to prevent physical damage possibly caused in a foldable device unused state.

Opening/Closing Speed Control of Foldable Device

As a folding angle between first and second bodies is changed to switch a foldable device to an open or closed state, the folding angle needs to be controlled at a different speed according to a type of a content to be provided instead of being controlled at a same speed. Various methods of differentiating an opening/closing speed of a foldable device are described with reference to FIGS. 14 to 16 as follows.

Figure 14:
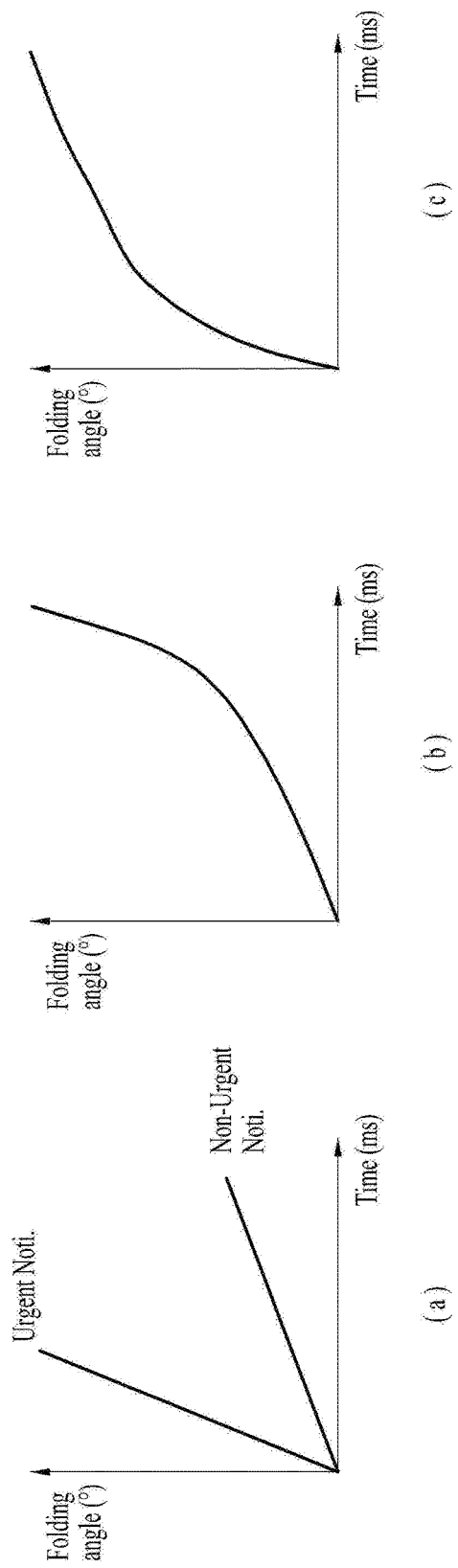
FIG. 14 is a diagram illustrating one example of an opening/closing speed of a foldable device according to one embodiment of the present invention.

FIG. 14 is a diagram illustrating one example of an opening/closing speed of a foldable device according to one embodiment of the present invention. For instance, a foldable device can control an actuator unit to switch to an open state at a constant speed or velocity. For instance, referring to FIG. 14 (a), if it is necessary to provide an urgent notification, the foldable device can control a folding angle to be changed at a fast constant speed. The urgent notification may correspond to a case of indicating a real-time confirmation required event such as a call reception, an alarm occurrence, or the like. In another instance, referring to FIG. 14 (a), if it is necessary to provide a non-urgent notification, the foldable device can control a folding angle to be changed at a relatively slow constant speed. The non-urgent notification may correspond to a case of indicating a real-time quick confirmation non-required event such as a notification related to a continuously run application or the like.

In another instance, the foldable device can control the actuator unit to switch to an open state by increasing acceleration. Referring to FIG. 14 (b), the foldable device can control the actuator unit to increase an opening speed by raising a folding angle variation according to time. In addition, the foldable device can control the actuator unit to switch to an open state by decreasing acceleration. Referring to FIG. 14 (c), the foldable device can control the actuator unit to decrease an opening speed by reducing a folding angle variation according to time.

Although the embodiment shown in FIG. 14 shows a case of switching to the open state in which the folding angle of the foldable device increases, it can be identically applied to a case of switching to a closed state. The speed change shown in FIG. 14 can be implemented on the foldable device using the electromagnet, the shape memory alloy and the like provided to the actuator unit. This will be described in detail with reference to FIG. 15 and FIG. 16. If the foldable device is opened or closed too fast, damage may be possibly caused to the display.

Figure 15:
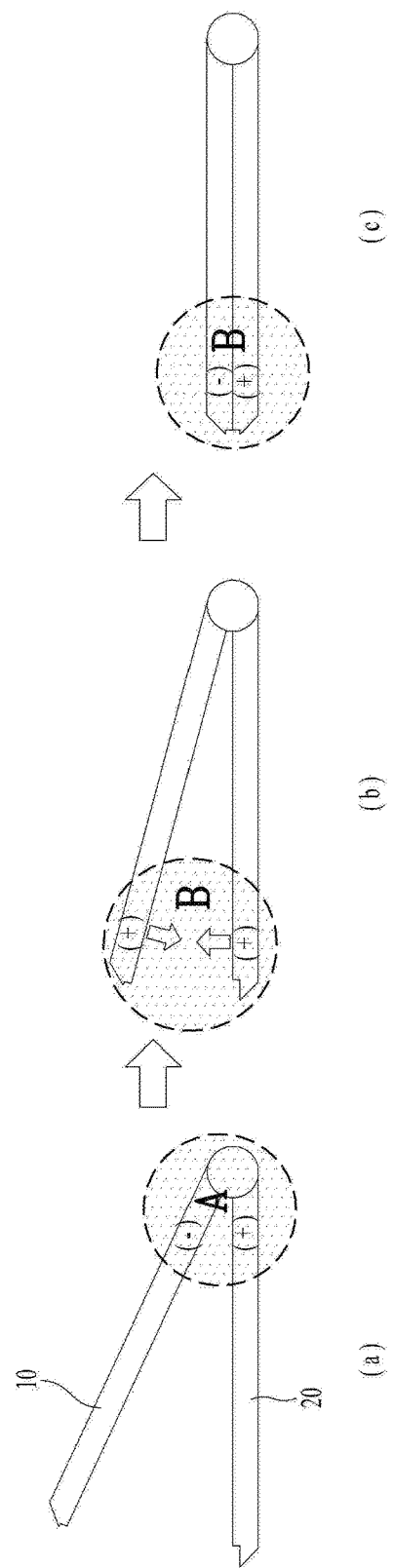
FIG. 15 is a diagram illustrating one example of controlling an opening/closing speed of a foldable device using a variable magnetic field according to one embodiment of the present invention.
Figure 16:
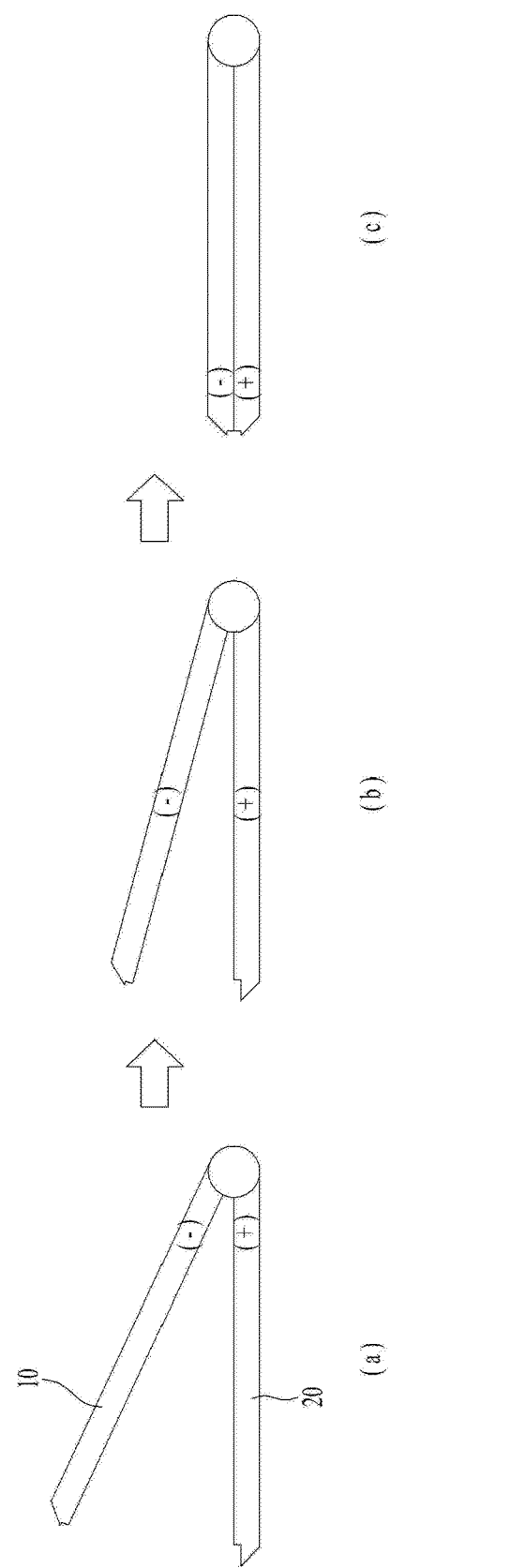
FIG. 16 is a diagram illustrating one example of controlling an opening/closing speed of a foldable device using a variable magnetic field according to one embodiment of the present invention.

According to the embodiment shown in FIG. 15 or FIG. 16, when a foldable device is folded at a folding angle (e.g., 30° or slimmer), it is difficult to check a content output to the display unit, and thus it can be assumed the foldable device is being closed.

In more detail, FIG. 15 is a diagram illustrating one example of controlling an opening/closing speed of a foldable device using a variable magnetic field according to one embodiment of the present invention. Particularly, FIG. 15 shows a method of controlling an opening/closing speed by changing magnetism of at least one of a first body 10 and a second body 20 of a foldable device.

Referring to FIG. 15 (a), if a folding angle becomes equal to or smaller than 30° in the course of switching to a closed state, a foldable device can control an actuator unit to differentiate magnetism of a region A close to a folding axis. Particularly, the foldable device can derive an attractive force to work in the region A by differentiating the magnetism of the first body 10 from that of the second body 20.

If the folding angle becomes smaller than 30°, the foldable device can control a display unit to be deactivated. As the first body 10 and the second body 20 differ from each other in magnetism, an attractive force is generated so that the foldable device can keep switching to a closed state.

Referring to FIG. 15 (b), if the folding angle becomes equal to or smaller than 5° in the course of continuing to switch to the closed state, the foldable device can control the actuator unit to equalize the magnetism of a region B distant from the folding axis. Particularly, the foldable device can derive a repulsive force to work in the region B by equalizing the magnetism of the first body 10 to that of the second body 20. As the magnetism of the first body 10 becomes equal to that of the second body 10, a closing speed may get reduced.

Referring to FIG. 15 (c), if the folding angle becomes equal to or smaller than 1° in the course of switching to the closed state, the foldable device can control the actuator unit to differentiate the magnetism of the region B. As the first body 10 and the second body 20 differ from each other in magnetism, an attractive force is generated to enable the foldable device to switch to the closed state smoothly. Since the angles 30°, 5° and 1° appearing in the embodiment shown in FIG. 15 are examples, magnetism can be changed at different angles according to a region.

FIG. 16 is a diagram illustrating one example of controlling an opening/closing speed of a foldable device using a variable magnetic field according to one embodiment of the present invention. Particularly, FIG. 16 shows a method of controlling an opening/closing speed by changing a region of magnetism by equally maintaining magnetism of a first body 10 and magnetism of a second body 20 in a foldable device.

Referring to FIG. 16 (a), if a folding angle becomes equal to or smaller than 30° in the course of switching to a closed state, a foldable device can control an actuator unit to generate magnetism from a region close to a folding axis. Referring to FIG. 16 (b), if the folding angle becomes equal to or smaller than 10° in the course of continuing to switch to the closed state, the foldable device can control the actuator unit to generate magnetism from a region distant from the folding axis.

Through this, the foldable device can control the opening/closing speed in order to prevent the foldable device from being switched to the closed state fast. Moreover, since the angles 30° and 10° appearing in the embodiment shown in FIG. 16 are examples, the embodiment can be implemented at other angles.

Folding Angle Control in Open State of Foldable Device

In the course of providing a user with a content through a display unit, it may be necessary for a foldable device to change a folding angle based on user's control, a content type, an environment and/or the like. Various embodiments for controlling a folding angle in the course of providing a content through a foldable device are described with reference to FIGS. 17 to 24 as follows.

Figure 17:
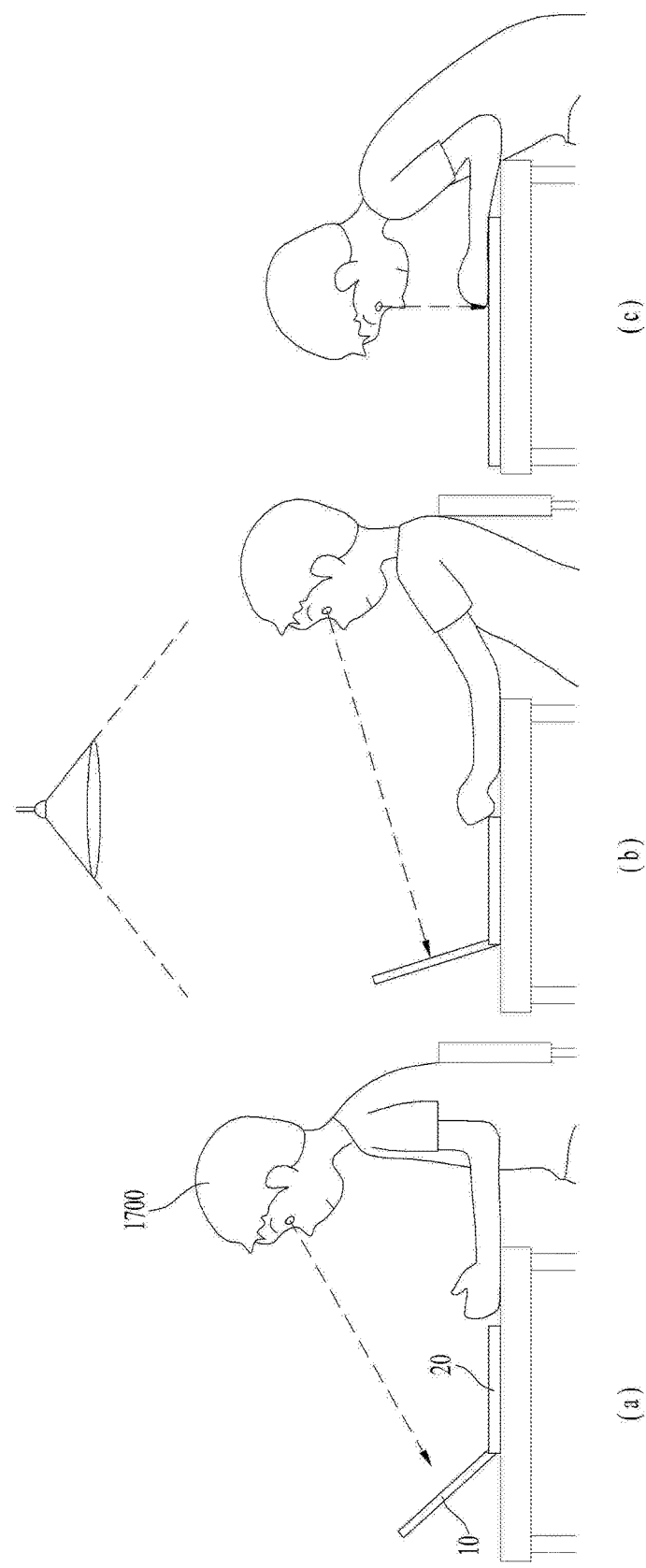
FIG. 17 is a diagram illustrating one example of controlling a folding angle in accordance with user's posture in a foldable device according to one embodiment of the present invention.

FIG. 17 is a diagram illustrating one example of controlling a folding angle in accordance with user's posture in a foldable device according to one embodiment of the present invention. According to the embodiment shown in FIG. 17, assume that an illumination sensor and a camera are provided to at least one of a first body 10 and a second body 20 of a foldable device.

A user 1700 may change a posture while using the foldable device. In this instance, the foldable device senses the user's posture and can control an actuator unit to provide an optimal folding angle of the foldable device based on the sensed posture. For instance, as shown in FIGS. 17 (*a*) to 17 (*c*), the foldable device recognizes user's iris through the camera and can determine user's location and distance with reference to the recognized iris.

In addition, the foldable device can determine an illumination and a reflection angle of a display. Through this, the foldable device can calculate a folding angle based on the user's location and distance and the reflection angle. And, the foldable device can control the actuator unit to change a real folding angle based on the calculated folding angle.

Figure 18:
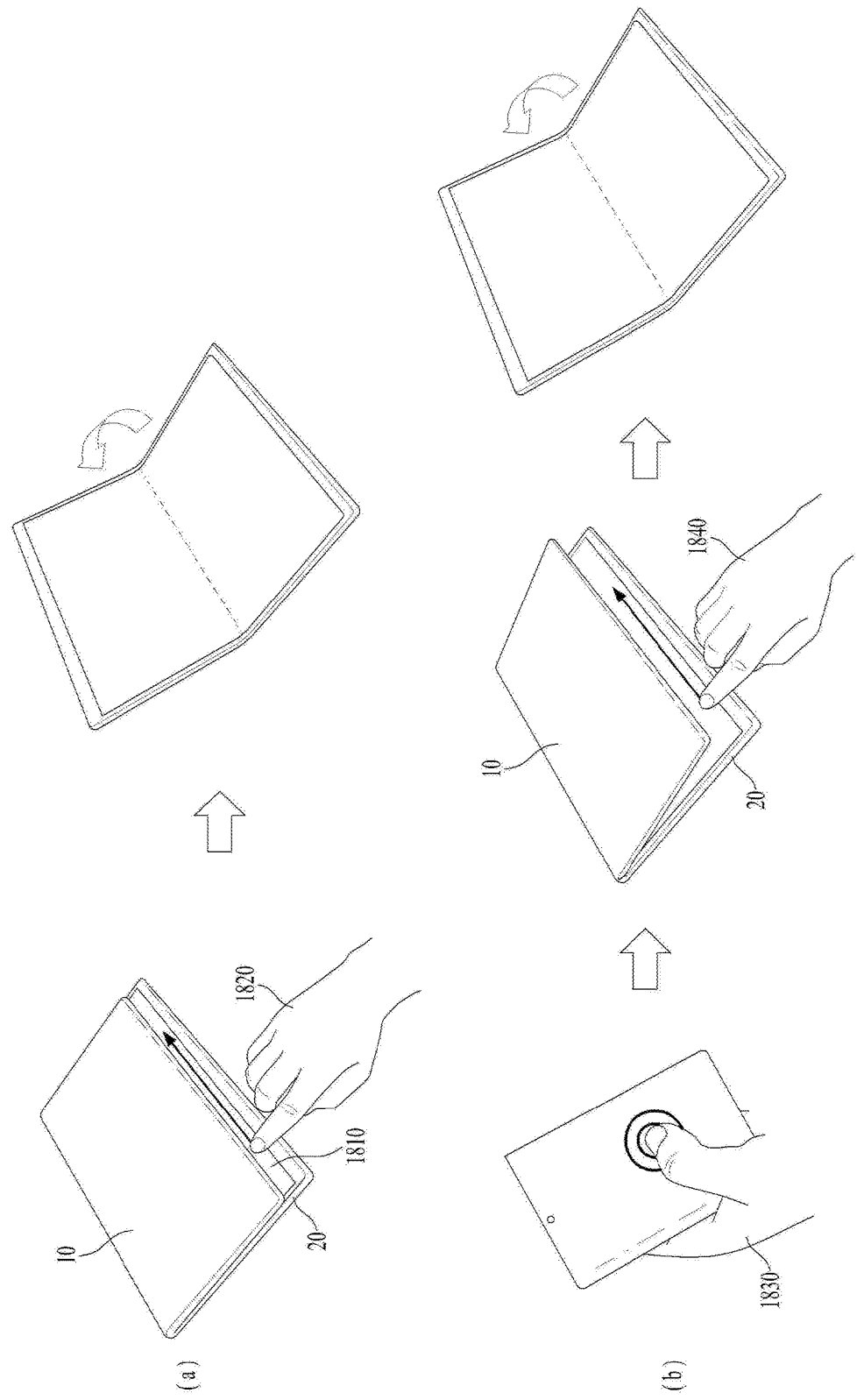
FIG. 18 is a diagram illustrating one example of controlling a folding angle in accordance with a scroll input in a foldable device according to one embodiment of the present invention.

Next, FIG. 18 is a diagram illustrating one example of controlling a folding angle in accordance with a scroll input in a foldable device according to one embodiment of the present invention. In FIG. 18 (*a*), a foldable device may correspond to an asymmetric device having first and second bodies 10 and 20 differ from each other in size. In this instance, a portion of a first or second display region may be provided as a control region 1810 to a user in a closed state. The case shown in FIG. 18 (*a*) may correspond to a device having a heterogeneous display region in a bended display form. The foldable device may provide the control region 1810 for the control of a folding angle in a closed state. With respect the control region 1810, assume that it is in an activated state to enable a display unit to be usable in a closed state of the foldable device.

The foldable device can sense a drag touch input 1820 to the control region 1810. As shown in a second diagram of FIG. 18 (*a*), in response to the drag touch input 1820, the foldable device can control the actuator unit to switch the first and second bodies 10 and 20 to an open state. Regarding this, a folding angle between the first and second bodies 10 and 20 can be determined based on a length of the drag touch input 1820. In particular, the folding angle can be changed by real time depending on the length of the drag touch input 1820. For instance, if the length of the drag touch input 1820 increases, the folding angle can increase in a range between 0° and 180°.

Referring to FIG. 18 (*b*), if a first input signal 1830 is sensed in a closed state of a foldable device, the device can perform user authentication by extracting fingerprint information. If the extracted fingerprint information matches a registered fingerprint information, the foldable device can control the actuator unit to adjust the folding angle into a first angle. For example, the first angle may correspond to 10°, by which the angle is non-limited. The foldable device can sense a second input signal 1840 to the display unit in an open state by the first angle. In this instance, the second input signal 1840 may correspond to the same drag touch input as described with reference to FIG. 18 (*a*). Hence, the folding angle between the first and second bodies 10 and 20 can be determined based on a length of the second input signal 1840.

According to the description of the embodiment shown in FIG. 18 (*b*), the folding angle through the fingerprint authentication becomes the first angle. In addition, the folding angle can be switched to the first angle by one of various schemes such as a direct opening by a user, an opening by a pattern input, and the like.

FIG. 19 is a diagram illustrating one example of a user interface provided based on a currently output content in a foldable device according to one embodiment of the present invention. Referring to FIG. 19 (*a*), while a foldable device is opened at a specific angle by a user, it can output a content to a display unit 151. Further, the output content may correspond to an application launched by a user. With respect to this, the foldable device can save information on the content, which is output at the specific angle, to a memory.

Hence, referring to FIG. 19 (*b*), while the foldable device is outputting the content at the specific angle, the device can control a popup window 1910, which indicates contents frequently output at the specific angle, to be output to the display unit 151. Thus, the user can use and switch the application frequently used at the specific angle easily and conveniently.

Figure 20:
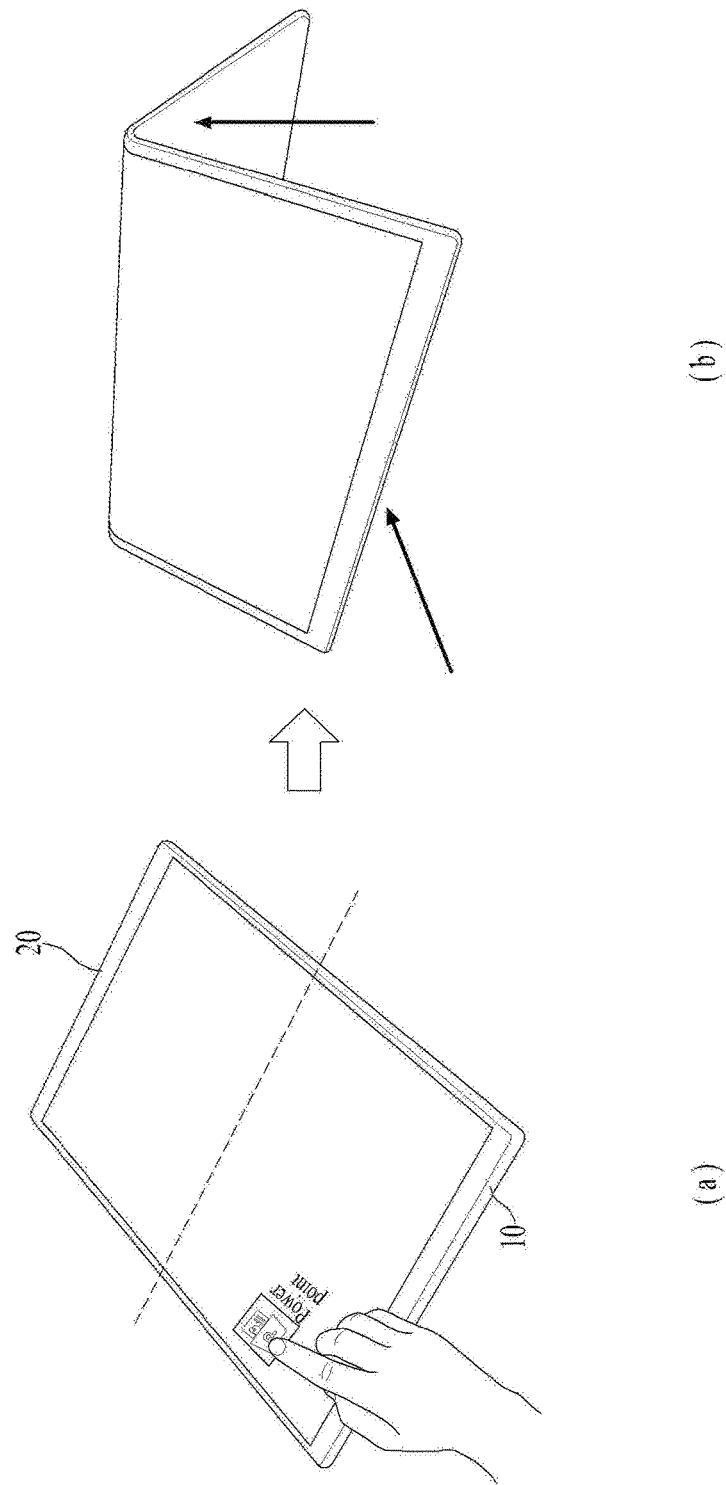
FIG. 20 is a diagram illustrating one example of controlling a folding angle for a plurality of users to use a foldable device according to one embodiment of the present invention.

FIG. 20 is a diagram illustrating one example of controlling a folding angle for a plurality of users to use a foldable device according to one embodiment of the present invention. As mentioned in the foregoing description, a folding angle of a foldable device according to an embodiment of the present invention can exceed 180° instead of being limited to 0°~180°. If the folding angle is formed to exceed 180°, a first display region 151*a* and a second display region 151*b* are provided in different directions, respectively. Therefore, a plurality of users can simultaneously use the foldable device together.

Referring to FIG. 20 (*a*), the foldable device can sense an input for launching an applicable, which can be used by a plurality of users, from a user in flat mode. Referring to FIG. 20 (*b*), the foldable device outputs the application usable for a plurality of users to a display unit and can also control an actuator unit to change the folding angle into an angle exceeding 180°. For example, the applicable usable for a plurality of users may include at least one of a game application, a presentation application and the like.

FIG. 21 is a diagram illustrating one example of controlling a folding angle based on a content run in a foldable device according to one embodiment of the present invention. Referring to FIG. 21 (*a*), a foldable device can output a menu icon indicating a preset application to a control region 2110. For instance, the preset application may correspond to one of a frequently used application, an application designated by a user and the like. The control region 2110 is assumed as the former control region 1810 shown in FIG. 18 (*a*). The foldable device can sense an input signal 2120 to one of the menu icons. For instance, in the example shown in FIG. 21 (*a*), the foldable device can sense a single tap input of selecting 'Drawing'.

If so, referring to FIG. 21 (*b*), the foldable device controls a display unit to output a drawing content 2130 and can control an actuator unit to change first and second bodies 10 and 20 into a folding angle corresponding to the drawing content 2130. For instance, the folding angle corresponding to the drawing content 2130 is an optimal angle for a user to perform a drawing. The folding angle may be set by a user or preset per content.

Figure 22:
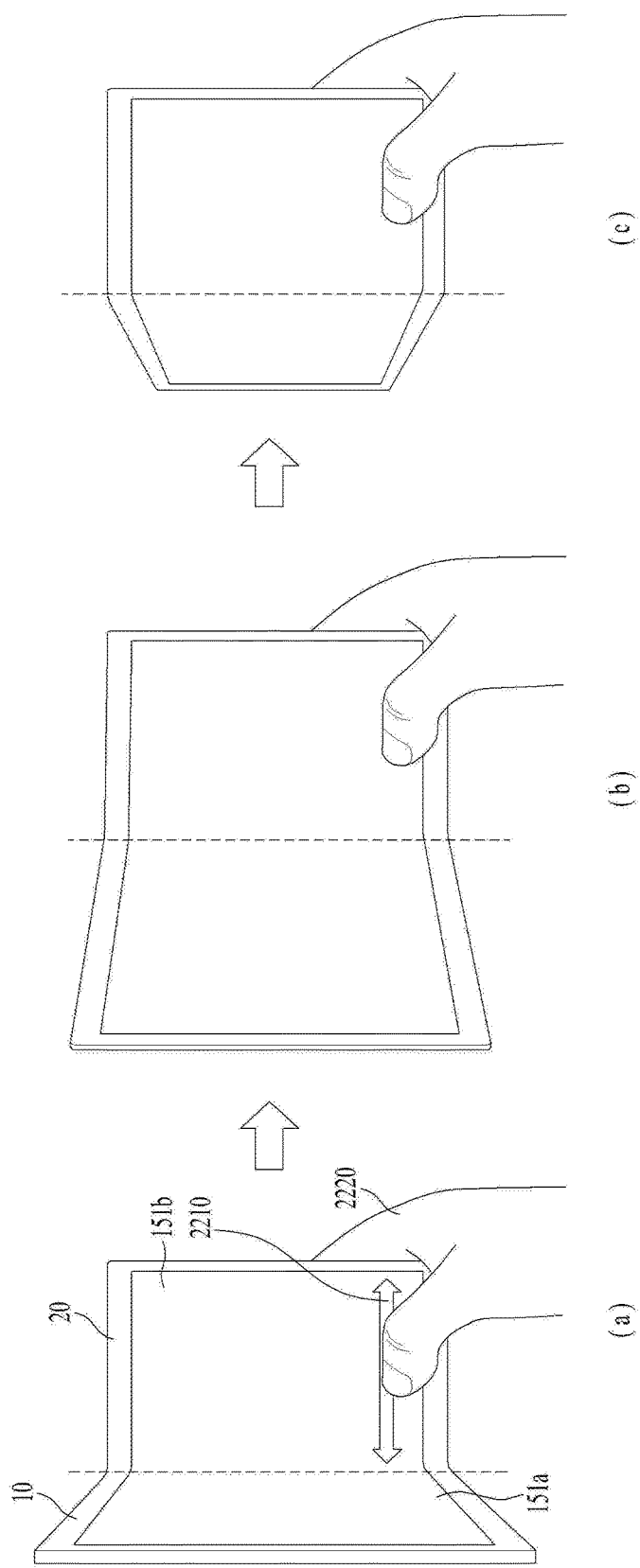
FIG. 22 is a diagram illustrating one example of controlling a folding angle in case of taking a panoramic image in a foldable device according to one embodiment of the present invention.

FIG. 22 is a diagram illustrating one example of controlling a folding angle in case of taking a panoramic image in a foldable device according to one embodiment of the present invention. First of all, a foldable device can launch a camera application when at least one of first and second bodies 10 and 20 is held by a user. Further, the user can control a camera application through a body part held by the user. Referring to FIG. 22 (*a*), while the second body 20 is held, the foldable device can output a control icon 2210 to a second display region 151*b*. According to the embodiment shown in FIG. 22, a camera is assumed as provided to a second plane of the first body 10. And, the control icon 2210 may correspond to an icon for changing a folding angle.

The foldable device can sense a drag touch input 2220 to the control icon 2210. In this instance, based on a direction and length of the drag touch input, the foldable device can control an actuator unit to change a folding angle. For instance, referring to FIG. 22 (b) and FIG. 22 (c), if the direction of the drag touch input 2220 faces a folding axis, the foldable device can control the actuator unit to increase the folding angle. If the length of the drag touch input 2220 increases more, as shown in FIG. 22 (c), the foldable device can control the actuator unit to further increase the folding angle.

Further, the first body 10 of the foldable device may be used to move the camera and the second body 20 of the foldable device may be used to output a preview image to the second display region 151b. Besides, if the direction of the drag touch input is opposite to the folding axis, the foldable device can control the actuator unit to decrease the folding angle, by which the present embodiment is non-limited. For example, the direction of the drag touch input and the increase/decrease of the folding angle can be implemented in reverse way.

Figure 23:
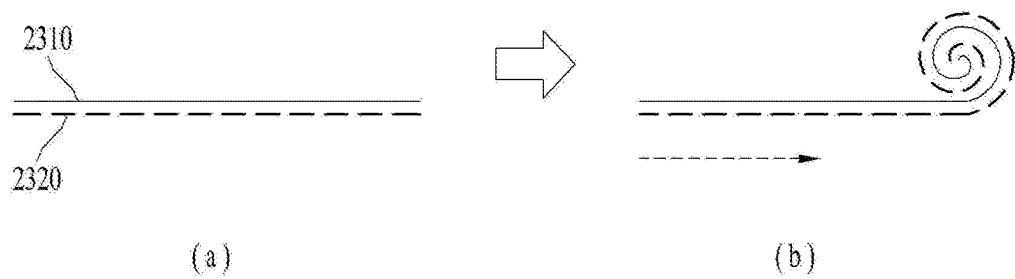
FIG. 23 is a diagram illustrating one example of embodying a foldable device in a rollable device according to one embodiment of the present invention.

FIG. 23 is a diagram illustrating one example of embodying a foldable device in a rollable device according to one embodiment of the present invention. Although a device of the present invention has been described as a foldable device having first and second bodies coming in contact with each other with reference to a folding axis, a display unit may be embodied in a rollable device capable of rolling. With respect to this, FIG. 23 (a) shows a flat mode, while FIG. 23 (b) shows a rolling mode.

In a device shown in FIG. 23, a first region 2310 corresponds to a flexible display panel and a second region 2320 disposed near the first region 2310 may correspond to a shape memory alloy panel. For instance, the shape memory alloy panel of the second region 2320 can memorize shapes of two types such as 'flat' and 'rolling'. Hence, if an input signal is sensed in the course of providing a content in flat mode (FIG. 23 (a)), the flat mode can be switched to a rolling mode (FIG. 23 (b)).

Figure 24:
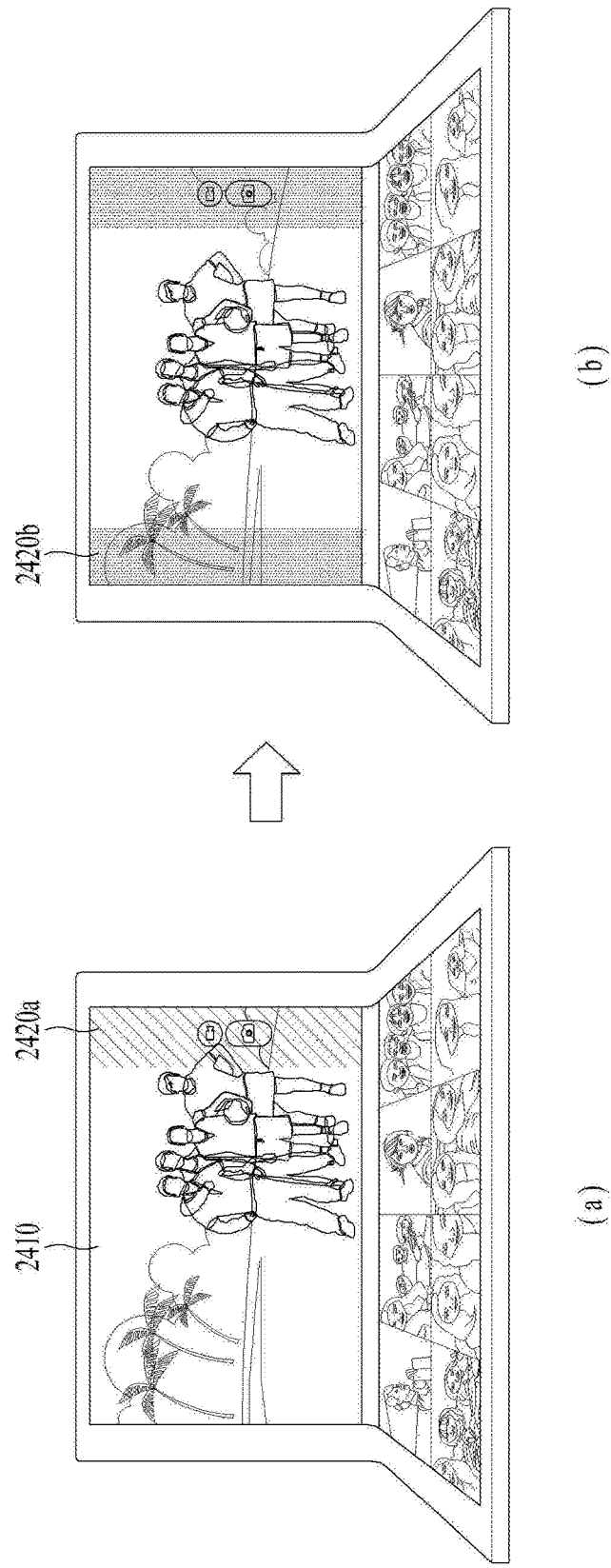
FIG. 24 is a diagram illustrating one example of a user interface provided in the course of running a camera application in a foldable device according to one embodiment of the present invention.

FIG. 24 is a diagram illustrating one example of a user interface provided in the course of running a camera application in a foldable device according to one embodiment of the present invention. Referring to FIG. 24 (a), a foldable device launches a camera application and can control a preview image 2410 to be output to a display unit. Further, a shot mode is assumed as a group photo shot mode. If a composition of characters included in a preview image fails to correspond to a preset composition, the foldable device can provide a user with a shot guide by outputting an indicator.

If characters are concentrated on one side in the preview image 2410, as shown in FIG. 24 (a), the foldable device outputs a first indicator 2420a to indicate that a margin is insufficient. Hence, if the composition of the characters in the preview image 2410 sensed in a view angle area is changed by moving the foldable device, as shown in FIG. 24 (b), the foldable device can indicate that the composition is appropriate by outputting a second indicator 2420b.

Folding Angle Control of Foldable Device Using Stylus Pen

As mentioned in the foregoing description, a foldable device can independently control a folding angle according to a user input or a content type. Moreover, while the foldable device is paired with an external device, the controller can control a folding angle based on a control signal from the external device. In case of sensing an input signal from a stylus pen or placing a stylus pen in a foldable device, a method of controlling a folding angle of the foldable device is described with reference to FIGS. 25 to 29 as follows.

According to the embodiments shown in FIGS. 25 to 29, assume that a stylus pen and a foldable device currently paired with other can transmit/receive data by wireless. And, the stylus pen is assumed as including configuration modules such as a touch sensing unit, a wireless communication unit, a controller and the like.

Figure 25:
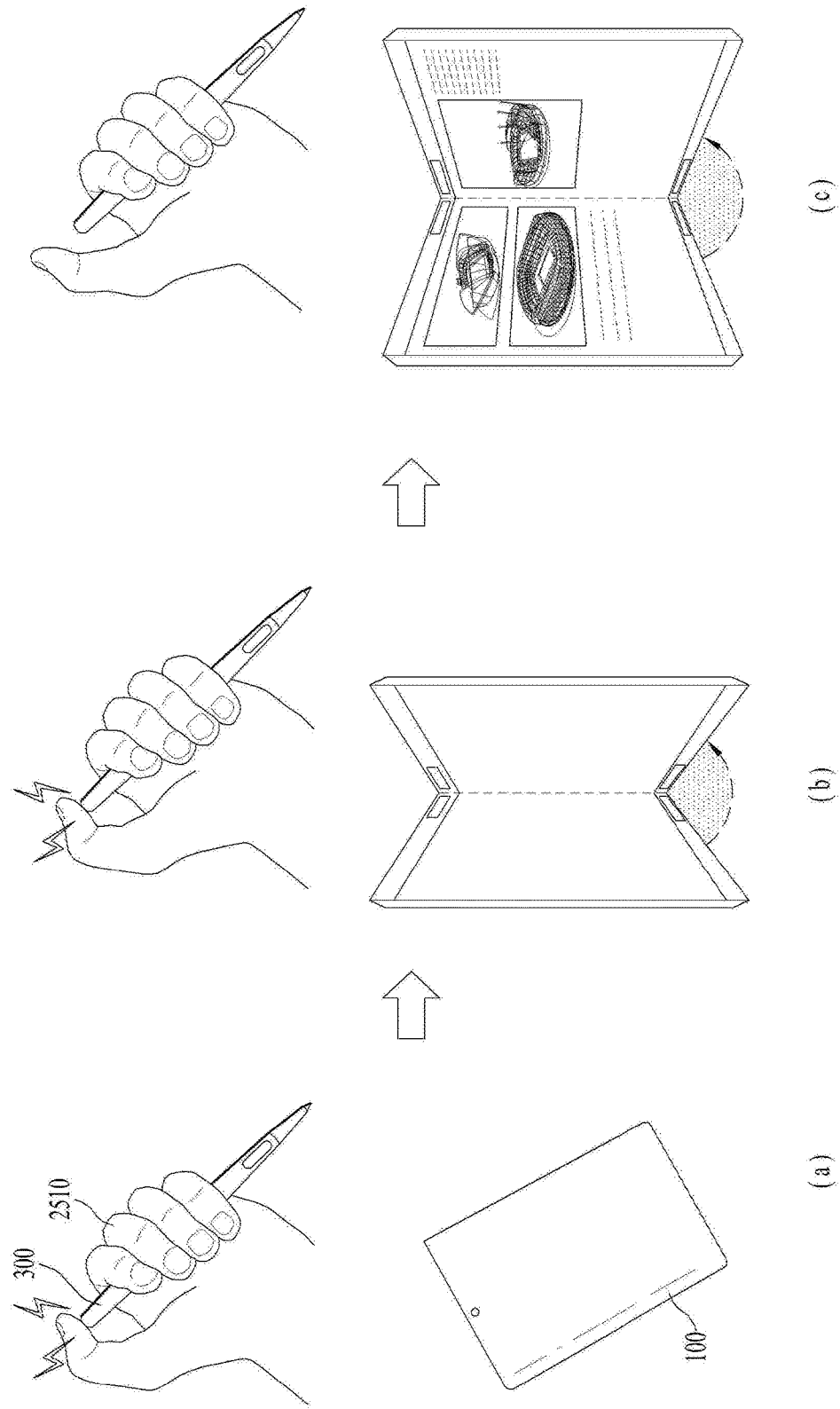
FIG. 25 is a diagram illustrating one example of controlling a folding angle of a foldable device using a stylus pen according to one embodiment of the present invention.

FIG. 25 is a diagram illustrating one example of controlling a folding angle of a foldable device using a stylus pen according to one embodiment of the present invention. Referring to FIG. 25 (a), a stylus pen 300 can sense a push input 2510 to a hardware key. The stylus pen 300 can send a control signal, which corresponds to the sensed push input 2510, to a foldable device. If so, referring to FIG. 25 (b), the foldable device can switch to an open state of increasing a folding angle. In this instance, the folding angle of the foldable device can increase in proportion to a duration time of the push input 2510 sensed by the stylus pen 300. Namely, a user can maintain the push input of the stylus pen 300 until the foldable device is opened at a desired angle.

Referring to FIG. 25 (c), the stylus pen 300 can sense a release state of the push input 2510. If the push input 2510 is released, the stylus pen 300 can send a control signal to the foldable device. Based on the control signal from the stylus pen 300, the foldable device can control an actuator unit to stop increasing the folding angle. Besides, when the folding angle of the foldable device exceeds 150°, if the push input sensed by the stylus pen 300 is released, the foldable device can control the actuator unit to increase the folding angle until a flat mode is automatically entered.

Figure 26:
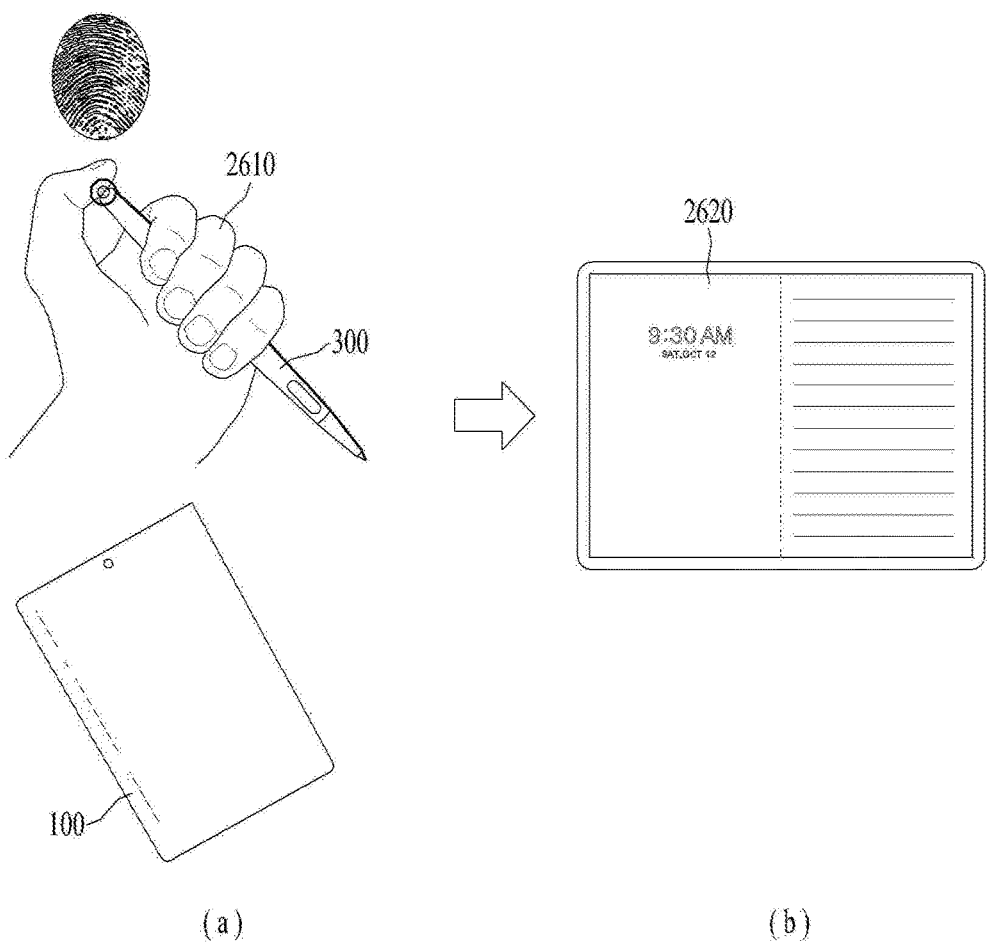
FIG. 26 is a diagram illustrating another example of controlling a folding angle of a foldable device using a stylus pen according to one embodiment of the present invention.

FIG. 26 is a diagram illustrating another example of controlling a folding angle of a foldable device using a stylus pen according to one embodiment of the present invention. Particularly, FIG. 26 shows a case that a preset content is output to a display unit when a foldable device switches to an open state in response to an input signal sensed by a stylus pen. Substances redundant with FIG. 25 are omitted from the description of the embodiment shown in FIG. 26. According to the embodiment shown in FIG. 26, assume that a stylus pen 300 is provided with a fingerprint sensing unit.

Referring to FIG. 26 (a), the stylus pen 300 can sense an input signal 2610 to a hardware key. The stylus pen 300 extracts fingerprint information from the input signal 2610 and compares it with a registered fingerprint information. If the extracted fingerprint information matches the registered fingerprint information, the stylus pen 300 completes user authentication and can send a control signal to a foldable device. Moreover, the foldable device can determine whether the extracted fingerprint information matches the registered fingerprint information as well as the stylus pen 300.

Based on the control signal received from the stylus pen 300, the foldable device can control the actuator to switch the foldable device to an open state. Moreover, as shown in FIG. 26 (b), the foldable device controls a folding angle for a flat mode and controls a preset content 2620 to be output to the display unit. The preset content 2620 of the embodiment of FIG. 26 (b) corresponds to a memo application, by which the present embodiment is non-limited.

Figure 27:
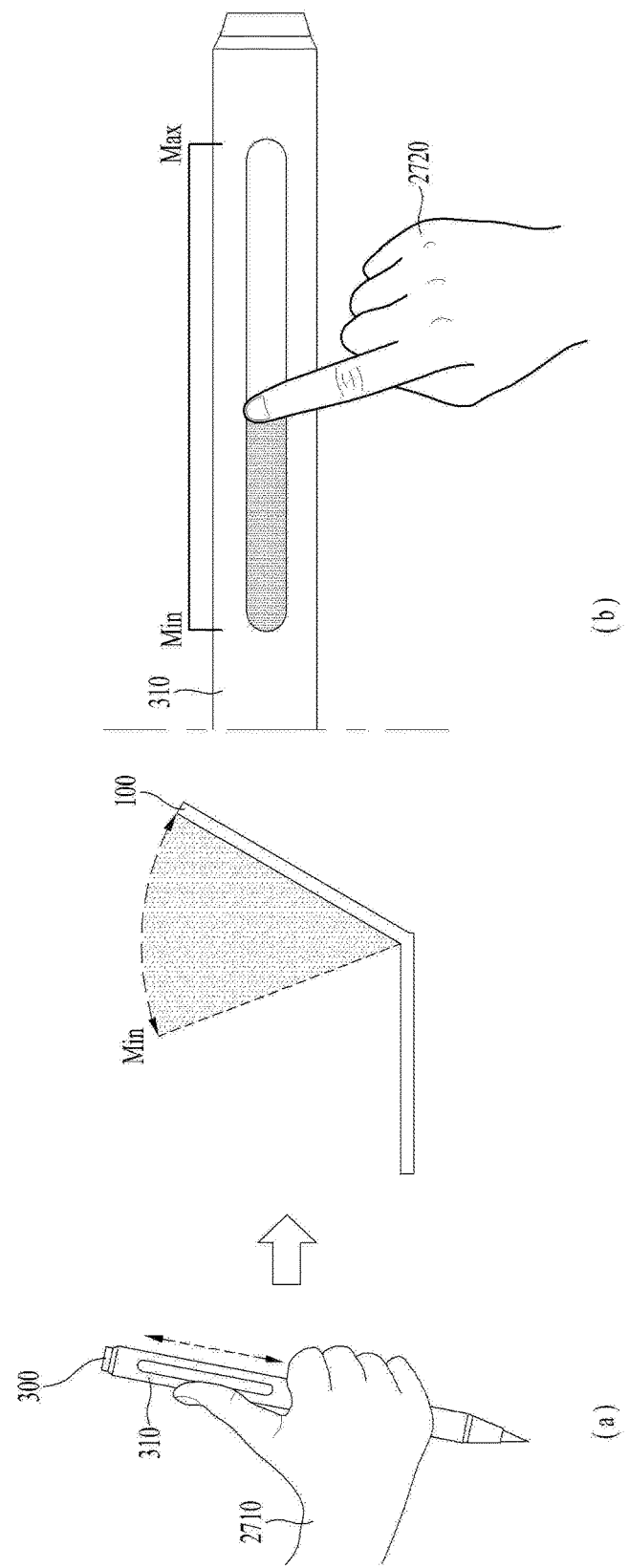
FIG. 27 is a diagram illustrating further example of controlling a folding angle of a foldable device using a stylus pen according to one embodiment of the present invention.

FIG. 27 is a diagram illustrating further example of controlling a folding angle of a foldable device using a stylus pen according to one embodiment of the present invention. Particularly, FIG. 27 shows a case of adjusting a folding angle into an angle appropriate for using an application currently run in a foldable device in response to an input signal sensed by a stylus pen.

According to the embodiment shown in FIG. 27, assume that the foldable device currently runs a camera application.

And, a camera is assumed as provided to a first plane having a display unit located thereon or a second plane opposite to the first plane. Moreover, assume that the foldable device is switched to an open state. For instance, the foldable device can switch to the open state in response to the input to the hardware key described in FIG. 25. For instance, the foldable device may switch to the open state in response to an input sensed when a user is holding the foldable device.

Referring to FIG. 27 (a), a user may intend to take an image in a view angle area through a camera of a foldable device. Further, a stylus pen 300 can sense an input signal 2710 to a touch sensing unit 310. Particularly, referring to FIG. 27 (b), the stylus pen 300 may sense an input signal 2720 to the touch sensing unit. If a display unit is provided, the stylus pen 300 may output an indicator indicating a length of the input signal 2720 through the display unit. And, the stylus pen 300 can send a control signal according to the sensed input signal to the foldable device.

If so, the foldable device can control a folding angle of the foldable device in response to the received control signal. If the folding angle is changed, a view angle area of the camera may be changed. Besides, if the folding angle control of the foldable device using the stylus pen is completed, a user can capture an image or video by applying an input signal to the stylus pen. For instance, the input signal may correspond to a push input to a hardware key.

Figure 28:
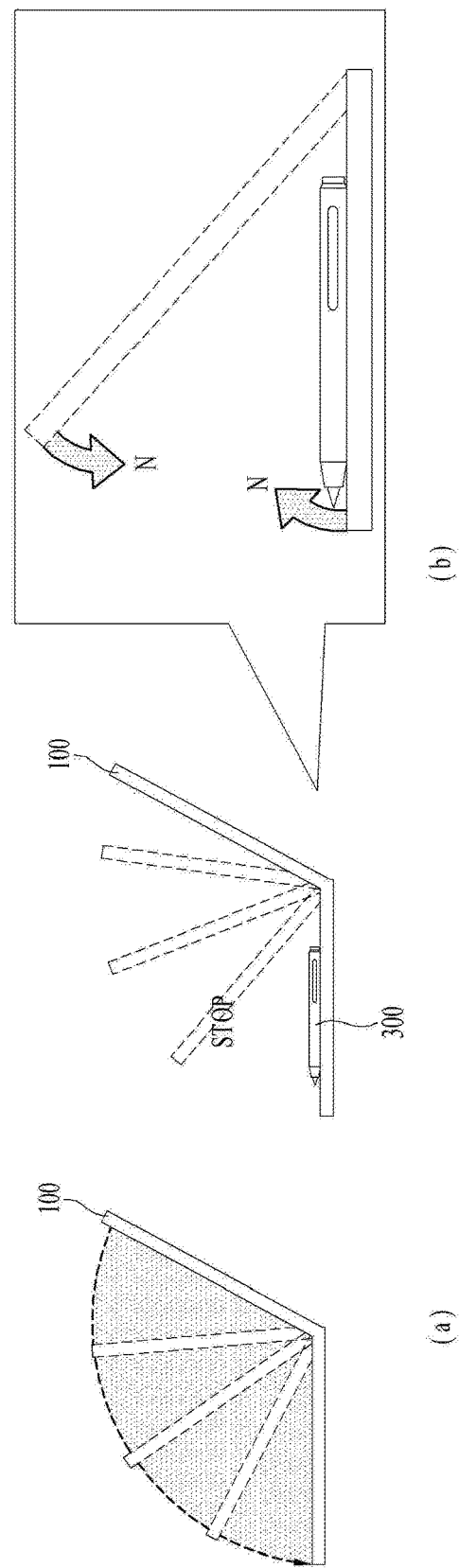
FIG. 28 is a diagram illustrating one example of controlling a folding angle in case of a stylus pen located within a foldable device according to one embodiment of the present invention.

FIG. 28 is a diagram illustrating one example of controlling a folding angle in case of a stylus pen located within a foldable device according to one embodiment of the present invention. Referring to FIG. 28 (a), when a stylus pen 300 is not located within a foldable device, if an input signal is sensed, the foldable device can control an actuator unit to enable a folding angle to be come 0°.

Referring to FIG. 28 (b), the foldable device can recognize an existence of the stylus pen 300 inside. For instance, if the stylus pen 300 is placed on a display unit, the foldable device can recognize an existence of the stylus pen 300 through a magnetic field or touch of a pen point of the stylus pen 300. In this instance, if an input signal is sensed, the foldable device decreases a folding angle. If a preset angle is reached in the course of decreasing the folding angle, the foldable device can generate a magnetic force of the same polarity from a predetermined region of each of first and second bodies.

Moreover, the foldable device can control itself to stop switching to a closed state owing to a repulsive force generated from at least one partial region of each of the first and second bodies. Through this, if the stylus pen 300 is located inside, the foldable device does not switch to he closed state so as to prevent breakage of a display. Besides, in case of recognizing the existence of the stylus pen 300 inside, the foldable device can inform a user of the recognized existence through sound notification, LED notification and/or the like.

Figure 29:
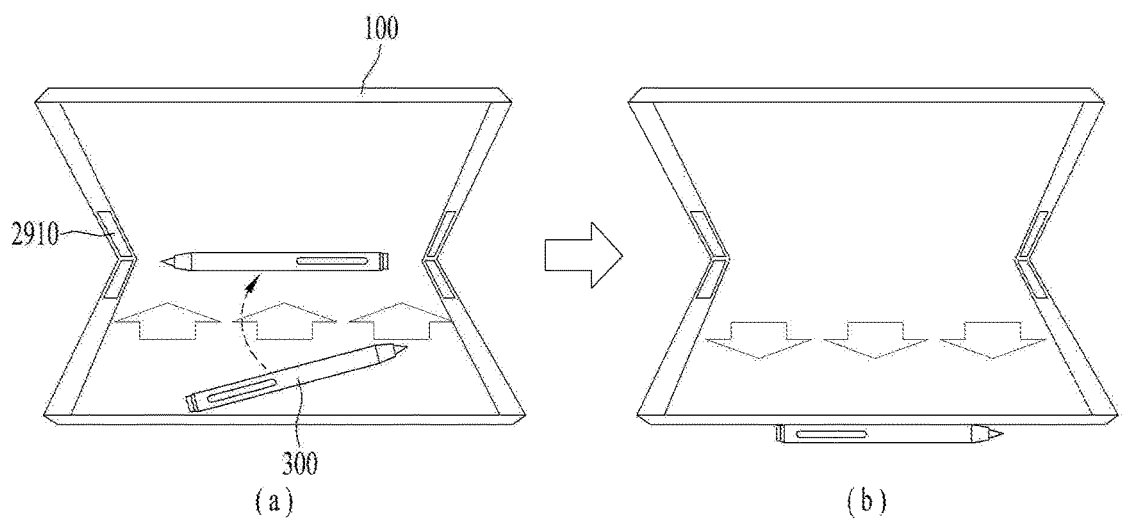
FIG. 29 is a diagram illustrating one example of controlling a foldable device in case of a stylus pen located within the foldable device according to one embodiment of the present invention.

FIG. 29 is a diagram illustrating one example of controlling a foldable device in case of a stylus pen located within the foldable device according to one embodiment of the present invention. According to an embodiment shown in FIG. 29, assume that a foldable device recognizes an existence of a stylus pen inside. Substances redundant with FIG. 28 are omitted from the description of the embodiment shown in FIG. 29.

Referring to FIG. 29 (a), if a foldable device recognizes an existence of a stylus pen 300 on a display unit, the controller can control an actuator unit to generate a magnetic force of polarity different from that of the stylus pen 300 from a region adjacent to a folding axis. For instance, if the polarity of the stylus pen 300 is '−', the foldable device can control the polarity of the region adjacent to the folding axis to become '+'.

A size of the magnetic force generated from the foldable device may increase if the folding angle of the foldable device decreases. If the folding angle decreases, the possibility of damage caused to the display unit by the stylus pen 300 increases. Moreover, the stylus pen 300 can move toward the folding axis based on an attractive force between the foldable device and the stylus pen 300.

Meanwhile, referring to FIG. 29 (b), if the foldable device recognizes an existence of the stylus pen 300 on the display unit, the controller can control the actuator unit to generate magnetism of the same polarity of the magnetism of the stylus pen 300 from first and second bodies. For instance, if the polarity of the stylus pen 300 is '−', the foldable device can control the actuator unit to enable the polarity of each of the first and second bodies to have '−'.

In this instance, since a repulsive force is generated between the stylus pen 300 and the foldable device, the stylus pen 300 can move out of the foldable device. Through this, the foldable device can prevent the breakage of the display despite switching to a closed state by moving the stylus pen 300 out of the foldable device.

Figure 30:
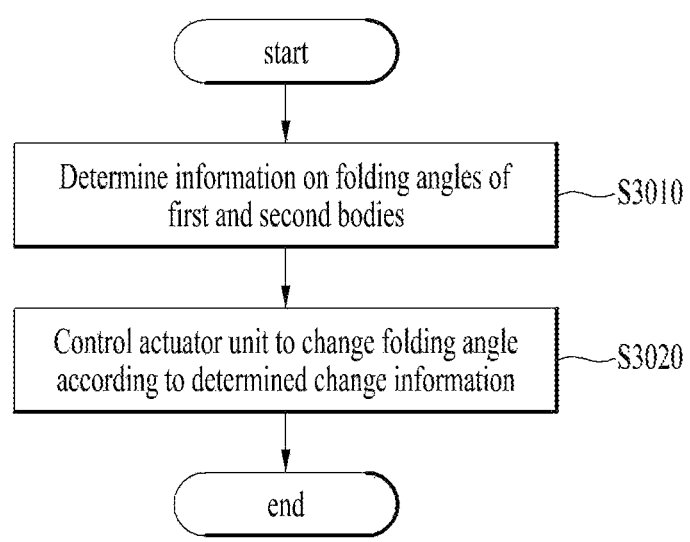
FIG. 30 is a flowchart for a method of controlling a foldable device according to one embodiment of the present invention.

FIG. 30 is a flowchart for a method of controlling a foldable device according to one embodiment of the present invention. Referring to FIG. 30, a foldable device can determine a change information on a folding angle between first and second bodies (S3010). With respect to this, the foldable device can recognize a current folding angle such as a closed or open state. The change information on the folding angle can be determined based on an input signal sensed from a user, a content currently output to a display unit, an unused time of a device and the like.

Subsequently, the foldable device can control an actuator unit to change the folding angle according to the determined change information (S3020). In particular, the foldable device can switch to the open or closed state in accordance with the determined change information. For instance, as mentioned in the foregoing description with reference to FIGS. 5 to 9, if user authentication is completed in the closed state, the foldable device can control the actuator unit to increase the folding angle of the foldable device.

As mentioned in the foregoing description with reference to FIGS. 10 to 12, if an input signal is sensed in the open state of the foldable device, the foldable device can control the actuator unit to switch the foldable device to the closed state. For instance, as mentioned in the foregoing description, if the foldable device fails to sense an input signal for a preset time in the open state, the device can control the actuator unit to switch the foldable device to the closed state.

Accordingly, embodiments of the present invention provide various advantages. According to at least one of embodiments of the present invention, although a user does not perform an input of folding or unfolding a foldable device each time, opening/closing of the foldable device is facilitated through various inputs. Therefore, the foldable device can be advantageously usable with one hand.

In addition, when a foldable device is opened/closed, an opening/closing speed can be advantageously adjusted through electromagnet or shape memory alloy. Further, adjustment of a folding angle is facilitated through a stylus pen connected to a foldable device as well as an opening/closing operation.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses.

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A foldable device, comprising:
a first body supporting a first display region;
a second body supporting a second display region;
a sensor configured to sense a folding angle between the first body and the second body;
an actuator configured to change the folding angle, the actuator comprising at least one of an electromagnet and a shape memory alloy; and
a controller configured to:
control the actuator to increase the folding angle between the first body and the second body without user physical pressure in response to a first predetermined input, and
control the actuator to decrease the folding angle between the first body and the second body without user physical pressure in response to a second predetermined input,
wherein the controller is further configured to:
when the foldable device is switched from an opened state to a closed state and the folding angle is equal to or smaller than a first angle, control the actuator to change a switching speed by switching a magnetism of at least one preset region of the first body and the second body, and
wherein if an event occurs in the closed state of the foldable device, the controller is further configured to determine the switching speed to the opened state of the foldable device based on a type of the occurring event.

2. The foldable device of claim 1, wherein the controller is further configured to:
control the actuator to continue increasing the folding angle until the foldable device is in the opened state in which the folding angle between the first body and the second body exceeds a second angle, in response to the first predetermined input, and
control the actuator to continue decreasing the folding angle until the foldable device is in the closed state in which the folding angle between the first body and the second body is equal to or smaller than the second angle.

3. The foldable device of claim 1, wherein a user authentication is performed based on at least one of a fingerprint input, a pattern input, an iris input, a touch input and a speech input.

4. The foldable device of claim 2, wherein the controller is further configured to:
sense an input signal when the foldable device is in the opened state, and
control the actuator to switch the foldable device to the closed state in response to the sensed input signal.

5. The foldable device of claim 2, wherein the controller is further configured to control the actuator to switch the foldable device to the closed state when the foldable device is in the opened state and an input signal has not been sensed for a preset time.

6. The foldable device of claim 1, further comprising:
a wireless communication processor configured to wirelessly communicate with a stylus pen,
wherein the controller is further configured to control the actuator to change the folding angle based on a control signal received from the stylus pen.

7. The foldable device of claim 6, wherein the controller is further configured to determine the changed folding angle based on at least one of a duration time and length of a user input sensed by the stylus pen.

8. The foldable device of claim 6, wherein when the foldable device is switched to the closed state, and if the stylus pen is located within the foldable device, the controller is further configured to control the actuator to enable a magnetism of the first body and the second body to be equal to that of the stylus pen.

9. The foldable device of claim 2, wherein if an input signal is sensed in the opened state, the controller is further configured to change the folding angle into a third angle.

10. The foldable device of claim 9, wherein the controller is further configured to output a preset content to the display unit in response to the input signal.

11. A method of controlling a foldable device including a first body supporting a first display region, and a second body supporting a second display region, the method comprising:
sensing, via a sensor of the foldable device, a folding angle between the first body and the second body;
controlling, via a controller, an actuator of the foldable device to increase the folding angle between the first body and the second body without user physical pressure in response to a first predetermined input, the actuator comprising at least one of an electromagnet and a shape memory alloy; and
controlling, via the controller, the actuator to decrease the folding angle between the first body and the second body without user physical pressure in response to a second predetermined input,
wherein the method further comprises:
when the foldable device is switched from an opened state to a closed state and the folding angle is equal to or smaller than a first angle, controlling the actuator to change a switching speed by switching a magnetism of at least one preset region of the first body and the second body; and if an event occurs in the closed state of the foldable device, determining the switching speed to the opened state of the foldable device based on a type of the occurring event.

12. The method of claim 11, further comprising:
controlling, via the controller, the actuator to continue increasing the folding angle until the foldable device is in the opened state in which the folding angle between the first body and the second body exceeds a second angle, in response to the first predetermined input; and
controlling, via the controller, the actuator to continue decreasing the folding angle until the foldable device is in the closed state in which the folding angle between the first body and the second body is equal to or smaller than the second angle.

13. The method of claim 11, wherein a user authentication is performed based on at least one of a fingerprint input, a pattern input, an iris input, a touch input and a speech input.

14. The method of claim 12, further comprising:
sensing, via the controller, an input signal when the foldable device is in the opened state; and
controlling, via the controller, the actuator to switch the foldable device to the closed state in response to the sensed input signal.

15. The method of claim 12, further comprising:
controlling the actuator to switch the foldable device to the closed state when the foldable device is in the opened state and an input signal has not been sensed for a preset time.

16. The mobile terminal of claim 1, wherein the controller is further configured to:
deactivate the first display region and the second display region in the closed state,
receive user authentication in the closed state, and
control the actuator to switch the foldable device to the opened state when the received user authentication matches stored user authentication information, and activate the first display region and the second display region when the foldable device is switched to the opened state.

* * * * *